(12) United States Patent
Yamagami et al.

(10) Patent No.: US 7,039,777 B2
(45) Date of Patent: *May 2, 2006

(54) METHOD AND APPARATUS FOR MANAGING REPLICATION VOLUMES

(75) Inventors: Kenji Yamagami, Los Gatos, CA (US); Naoki Watanabe, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 411 days.

This patent is subject to a terminal disclaimer.

(21) Appl. No.: 10/305,714

(22) Filed: Nov. 27, 2002

(65) Prior Publication Data

US 2003/0233518 A1 Dec. 18, 2003

Related U.S. Application Data

(63) Continuation-in-part of application No. 10/170,804, filed on Jun. 12, 2002, now Pat. No. 6,925,541.

(51) Int. Cl.
G06F 12/16 (2006.01)

(52) U.S. Cl. .................... 711/162; 711/114; 714/6; 714/7; 714/5

(58) Field of Classification Search .............. 711/4, 711/111, 112, 113, 114, 161, 162; 714/5, 714/6, 7, 8
See application file for complete search history.

(56) References Cited

U.S. PATENT DOCUMENTS

| | | | |
|---|---|---|---|
| 4,686,623 A | 8/1987 | Wallace | |
| 5,276,867 A | 1/1994 | Kenley et al. | |
| 5,459,857 A | 10/1995 | Ludlam et al. | |
| 5,511,177 A | 4/1996 | Kagimasa et al. | |
| 5,544,347 A | 8/1996 | Yanai et al. | |
| 5,548,724 A | 8/1996 | Akizawa et al. | |
| 5,737,745 A | 4/1998 | Matsumoto et al. | |
| 5,893,919 A * | 4/1999 | Sarkozy et al. | 711/114 |
| 5,933,653 A | 8/1999 | Ofek | |
| 5,943,688 A | 8/1999 | Fisher et al. | |
| 5,999,712 A | 12/1999 | Moiin et al. | |
| 6,035,306 A | 3/2000 | Lowenthal et al. | |
| 6,038,677 A | 3/2000 | Lawlor et al. | |
| 6,061,807 A | 5/2000 | Albert | |
| 6,105,118 A | 8/2000 | Maddalozzo et al. | |
| 6,173,420 B1 | 1/2001 | Sunkara et al. | |
| 6,195,732 B1 | 2/2001 | Adams et al. | |
| 6,216,211 B1 | 4/2001 | McBrearty et al. | |
| 6,269,431 B1 | 7/2001 | Dunham | |
| 6,324,654 B1 * | 11/2001 | Wahl et al. | 714/6 |
| 6,393,485 B1 | 5/2002 | Chao et al. | |
| 6,425,049 B1 | 7/2002 | Yamamoto et al. | |
| 6,438,705 B1 | 8/2002 | Chao et al. | |

(Continued)

OTHER PUBLICATIONS

Clarke. "Technical Introduction to Oracle Fail Safe, A Guide to Concepts and Terminology," An Oracle Technical White Paper, Oracle Corporation Redwood Shores, CA (2001).

(Continued)

Primary Examiner—B. James Peikari
(74) Attorney, Agent, or Firm—Townsend and Townsend and Crew LLP

(57) ABSTRACT

Replication of volumes is facilitated by tools which provide and manage a pool of mirror volumes. Primary (or production) volumes containing user provided data are easily mirrored by volumes selected from the pool. User criteria can be provided to limit the selection of candidate volumes for mirroring.

13 Claims, 15 Drawing Sheets

U.S. PATENT DOCUMENTS

| | | |
|---|---|---|
| 6,597,862 B1 | 7/2003 | Saeki et al. |
| 6,606,643 B1 | 8/2003 | Emens et al. |
| 6,633,955 B1 | 10/2003 | Yin et al. |
| 6,665,780 B1 | 12/2003 | Bradley |
| 6,745,341 B1 | 6/2004 | Onitsuka et al. |
| 2001/0044807 A1 | 11/2001 | Kleiman et al. |
| 2002/0004857 A1 | 1/2002 | Arakawa et al. |
| 2002/0007445 A1 | 1/2002 | Blumenau et al. |
| 2004/0019822 A1 | 1/2004 | Knapp |
| 2004/0030851 A1 | 2/2004 | Ohran et al. |
| 2004/0230863 A1 | 11/2004 | Buchhorn |

OTHER PUBLICATIONS

Managing Resource Definitions in Distributed Systems, IBM Technical Disclosure Bulletin, Dec. 1995, 81-84.

Methodology for Profile Replication, IBM Technical Disclosure Bulletin, Nov. 1992.

* cited by examiner

Server Information ─350

| Server Name | gertrude | ─351 |
|---|---|---|
| IP Address | 206.14.91.50 | ─352 |
| Server Information | Product = E450<br>Vendor = SUN | ─353 |

*FIG. 3A*

Application Information ─300

| Application Name | Oracle | ─301 |
|---|---|---|
| Instance Identifier | PROD1 | ─302 |
| Mapping Information | Tablespace:<br>•TBS1 = {/u01/ora/data/tbs01.ora,<br>/u02/ora/data/tbs00.ora}<br>Online Redo Logfile<br>•/u01/ora/rdo/log1PROD.ora<br>•/u01/ora/rdo/log2PROD.ora<br>Archieved Redo Logfile<br>•/u01/arc | ─303 |

*FIG. 3B*

Volume Manager Information ─310

| Volume Manager Name | Veritas VxVM | ─311 |
|---|---|---|
| Disk Group Information 1 | •Disk Group Name = VG0<br>•Version = 3.2<br>•List of logical volumes in the disk group<br>{/dev/vx/dsk/VG01/vol01,<br>/dev/vx/dsk/VG02/vol02}<br>•A list of devices in the disk group<br>{c2t0d1, c2t0d2, c3t1d0}<br>•Backup disk group configuration | ─312 |

*FIG. 3D*

File System Information ─320

| Filesystem Information 1 | •Volume Name = /dev/vx/dsk/VG01/vol01<br>•Mount point = /u01/ora/data<br>•Filesystem Type = VxFS<br>•Version = 3.2<br>•Capacity = 19,681,014 Kbyte<br>•Used = 19.650,104 Kbyte | ─322 |
|---|---|---|

*FIG. 3C*

Operating System Information ─ 330

| OS Name | Solaris 2.8 | ─ 331 |
|---|---|---|
| Vendor | SUN | ─ 332 |

FIG. 3E

Physical Volume Information ─ 340

| Physical Volume Name | c2t0d1 | ─ 341 |
|---|---|---|
| Physical Disk Information | • Vendor = Storage Co.<br>• System = HiEnd 2002<br>• Serial# = 60233<br>• Volume ID = 100<br>• RAID Group ID = 200<br>• RAID Group Busy Rate = 40% | ─ 342 |
| Mirror Information 1 | • Mirror Name = MIRROR1<br>• Volume Name = c3t0d2<br>• Vendor = Storage Co.<br>• System = HiEnd 2002<br>• Serial# = 60233<br>• Volume ID = 100<br>• Physical Disk Group = 200 | ─ 343 |
| Mirror Information 2 | • Mirror Name = MIRROR2<br>• Volume Name = N/A<br>• Vendor = Storage Co.<br>• System = HiEnd 2002<br>• Serial# = 60233<br>• Volume ID = 100<br>• Physical Disk Group = 200 | ─ 343 |

FIG. 3F

Physical Volume Information /—340'

| Physical Volume Name | c2t0d1 | —341 |
|---|---|---|
| Physical Disk Information | • Vendor = Storage Co.<br>• System = HiEnd 2002<br>• Serial# = 60233<br>• Volume ID = 100<br>• RAID Group ID = 200<br>• RAID Group Busy Rate = 40% | —342 |
| Mirror Information 1 | • Mirror Name = MIRROR1<br>• Volume Name = c3t0d2<br>• Vendor = Storage Co.<br>• System = HiEnd 2002<br>• Serial# = 60233<br>• Volume ID = 100<br>• Physical Disk Group = 200 | —343 |
| Mirror Information 2 | • Mirror Name = MIRROR2<br>• Volume Name = N/A<br>• Vendor = Storage Co.<br>• System = HiEnd 2002<br>• Serial# = 60233<br>• Volume ID = 100<br>• Physical Disk Group = 200 | —343 |
| LINK(s) | storage 1050c, storage 1050d | —342a |
| LOCUS (DOMAIN NAME) | San Francisco | —342b |

FIG. 3G

400
Volume Pool Information

| Volume Pool Name | DBADMIN | |
|---|---|---|
| | | ←401 |
| Privilege | OWNER = Fred (RU)<br>GROUP = DBA(RU)<br>OTHER = (--) | ←402 |
| Volume0 Information | • Performance Level = 1 (Excellent)<br>• Reliability Level = 1 (Excellent)<br>• Vendor = Storage Co.<br>• System = HiEnd 2002<br>• Serial# = 60233<br>• Volume ID = 100<br>• Physical Disk Group = 200<br>• Sitename = Mt. View<br>• In use = NO | ←403 |
| Volume1 Information | • Performance Level = 2 (Good)<br>• Reliability Level = 3 (Fair)<br>• Vendor = Storage Co.<br>• System = HiEnd 2001<br>• Serial# = 50235<br>• Volume ID = 0<br>• Physical Disk Group = 15<br>• Sitename = Roxbury<br>• In use = YES | ←403 |

METHOD AND APPARATUS FOR MANAGING REPLICATION VOLUMES

CROSS-REFERENCES TO RELATED APPLICATIONS

This application is a continuation-in-part of commonly owned, U.S. application Ser. No. 10/170,804, filed Jun. 12, 2002 now U.S. Pat. No. 6,925,541.

STATEMENT AS TO RIGHTS TO INVENTIONS MADE UNDER FEDERALLY SPONSORED RESEARCH OR DEVELOPMENT

Not applicable

REFERENCE TO A "SEQUENCE LISTING," A TABLE, OR A COMPUTER PROGRAM LISTING APPENDIX SUBMITTED ON A COMPACT DISK.

Not applicable

BACKGROUND OF THE INVENTION

The present invention relates to data storage systems and in particular to management of replication ("mirror") volumes in a data storage system.

A data processing system in an enterprise typically requires a large amount of data storage. Customer data and data generated by users within the enterprise, occupy a great portion of this data storage. Any loss or compromise of such data can be catastrophic and severely impact the success of the business. Robust data processing systems provide back-up copies of the data to prevent such loss. To further protect the data, some data processing systems extend the practice of making back-up copies to provide disaster recovery. In disaster recovery systems, a back-up copy of the data is kept at a site remote from the primary storage location (sometimes referred to herein as a "production" storage location, or the like to reflect the nature of the data, i.e. production data, that is being stored). If a disaster strikes the primary storage location, the data can be recovered from the back-up copies located at the remote site.

A known method of providing disaster protection is to mirror, or shadow, the primary storage data at a remote storage site. Remote dual copy, or remote data duplexing, is one form of this data mirroring solution. In remote dual copy, remote storage devices are provided in the data processing system so that a copy of the primary data is written to a remote storage device. Storage devices are coupled together to form duplex pairs, each duplex pair consisting of a primary storage device and a secondary storage device. When data is written to the production volume (also referred to as "primary storage device"), the data processing system automatically copies the data to the mirror volume (or, "secondary storage device"). The mirror volume contains an exact physical image, or mirror, of the production volume. Typically, the production volume and the mirror volume have the same physical geometry, being configured and formatted in the same way as the production volume.

It is worth noting that "local" mirroring is also used for backup and recovery purposes, where the mirror volumes are located locally with the primary volume. Typically, local mirroring is used for backup and recovery, while remote mirroring is used for disaster recovery. Comparing to conventional tape backup, local mirroring is much faster but more expensive.

As the data storage capacity of an enterprise grows, storage administrative tasks become more complicated and more critical. Defining (or allocating) a new volume in a storage system is one of the most important tasks for storage administration in order to keep up with the data demands of the enterprise. As the data storage system increases so too does the complexity of a data storage manager subsystem for managing the primary ("production") storage volumes and the backup mirror volumes. However in a large data storage facility, it can be rather difficult to select a volume to be mirrored, because:

The candidate mirror volume must not be in use.
The candidate mirror volume should be selected appropriately, for example,
(1) The candidate volume should not be in the same physical disks as the production volume being mirrored. If the physical disks fail, then both production volume and mirror volume would be lost.
(2) The candidate volume should be in physical disks that have performance and reliability characteristics comparable to physical disks comprising the production volume being mirrored.
(3) Although (2) is the basic rule and should be applied as a default, the performance and reliability of the candidate volume should be selectable by a user.
(4) The candidate volume should not be comprised of physical disks that are heavily loaded. For example, if the physical disks contain volumes allocated as production volumes, such disks should not be allocated to serve as a mirror volume.

After a user finds a volume for a mirror, the user has to perform an operation referred to as "creating a mirror;" i.e. to initiate a mirroring operation between the primary volume and the mirror volume. This can be achieved in a command line interface, for example, by entering or otherwise specifying a command like:

createmirror vol1 vol2 where vol1 is the production volume and vol2 is its mirror volume.

Typing the command above would take time if the user has to create many mirrors. For example, in a real world setting, databases that consume more than several hundred gigabytes of storage are common; image and video databases can consume on the order of terabytes of storage. Typical implementations of such large storage facilities may require many tens to hundreds of production volumes. For example, a 50 volume configuration would require typing in the following 50 commands:

createmirror vol1 vol2
createmirror vol3 vol4
createmirror vol5 vol6
createmirror vol99 vol100

Applications which have large associated data objects ("application objects," "data sets," etc.) can benefit from mirroring techniques. One class of applications are database applications, where the associated data objects can span over multiple volumes in a large database. For example, a data object such as an instance of a database (an Oracle® database, for example) may comprise a multiplicity of data files that can be deployed across many primary volumes. In order to assure data recovery, the primary volumes which collectively store the data object should be mirrored. Since a database application can define many instances of a database, it might be desirable from a system management point of view to be able to mirror only those physical volumes which store a particular instance of a database.

Another class of applications sometimes referred to as a Logical Volume Manager (LVM), such as VxVM® produced and sold by Veritas Software Corporation, provide users with a logical view of the underlying and typically disparate collection of physical primary volumes. Again, error recovery can be provided by mirroring the primary volumes. Since, multiple logical volumes can be defined on the primary volumes, it might be desirable to be able to mirror only those primary volumes which constitute a particular logical volume. Thus for this type of software, the "data object" would be the logical volume presented to the user.

U.S. Pat. Nos. 5,459,857 and 5,544,347 disclose remote mirroring technology. Two disk systems at separate locations are connected a by remote link. The local disk system copies data on a local disk when pair creation is indicated. When a host updates data on the disk, the local disk system transfers the data to the remote disk system through the remote link. Thus no host operation is required to maintain a mirror of two volumes.

U.S. Pat. No. 5,933,653 discloses types of data transferring methods between the local and remote disk systems. In a synchronous mode transfer, the local disk system transfers data to the remote disk system before completing a write request from a host. In a semi-sync mode, the local disk system completes a write request and then transfers the write data to the remote disk system. Succeeding write requests are not processed until finishing the previous data transfer. In an adaptive copy mode, pending data to the remote disk system is stored in a memory and transferred to the remote disk system when the local disk system and/or remote links are available for the copy task.

In a remote copy architecture, additional factors must be considered when performing mirror site selection, which can further burden the system administrator. For example, in order to create a mirror to a remote volume, there must be a connection between the local and remote copy storage systems. For disaster recovery purposes, the two storage systems should be separated by a sufficient distance to permit recovery if a disaster should befall the primary volume. On the other hand, the remote copy performance must be balanced against the desired level of reliability during recovery. When a fail-over occurs, the remote storage system which serves as the standby storage system must be accessible by the servers at the failed site. In addition, a suitable operating system must be available, the proper suite of application programs must be installed, and so on, must be available in the standby system.

It can be appreciated that there is a need to effectively manage large and widely distributed storage facilities. There is a need to facilitate the system administrator's storage management tasks.

SUMMARY OF THE INVENTION

Embodiments in accordance with the present invention include a method and apparatus for providing a volume pool. One or more mirror volumes are selected from the volume pool to perform mirroring of user-specified primary (production) volumes. The specific mirror volumes are not specified by the user, which can be a human user or a machine user. The user can specify primary volumes by referencing an application and an associated data object. The user can specify a volume pool from which mirror volumes are selected. The present invention is applicable to local mirroring configurations and to remote mirroring configurations. The present invention further is applicable to storage configurations which employ a remote copy architecture.

BRIEF DESCRIPTION OF THE DRAWINGS

Aspects, advantages and novel features of the present invention will become apparent from the following description of the invention presented in conjunction with the accompanying drawings:

FIGS. 3A–3G and 4 show illustrative implementations of information tables according an embodiment of the present invention;

DESCRIPTION OF THE SPECIFIC EMBODIMENTS

Figure 1:
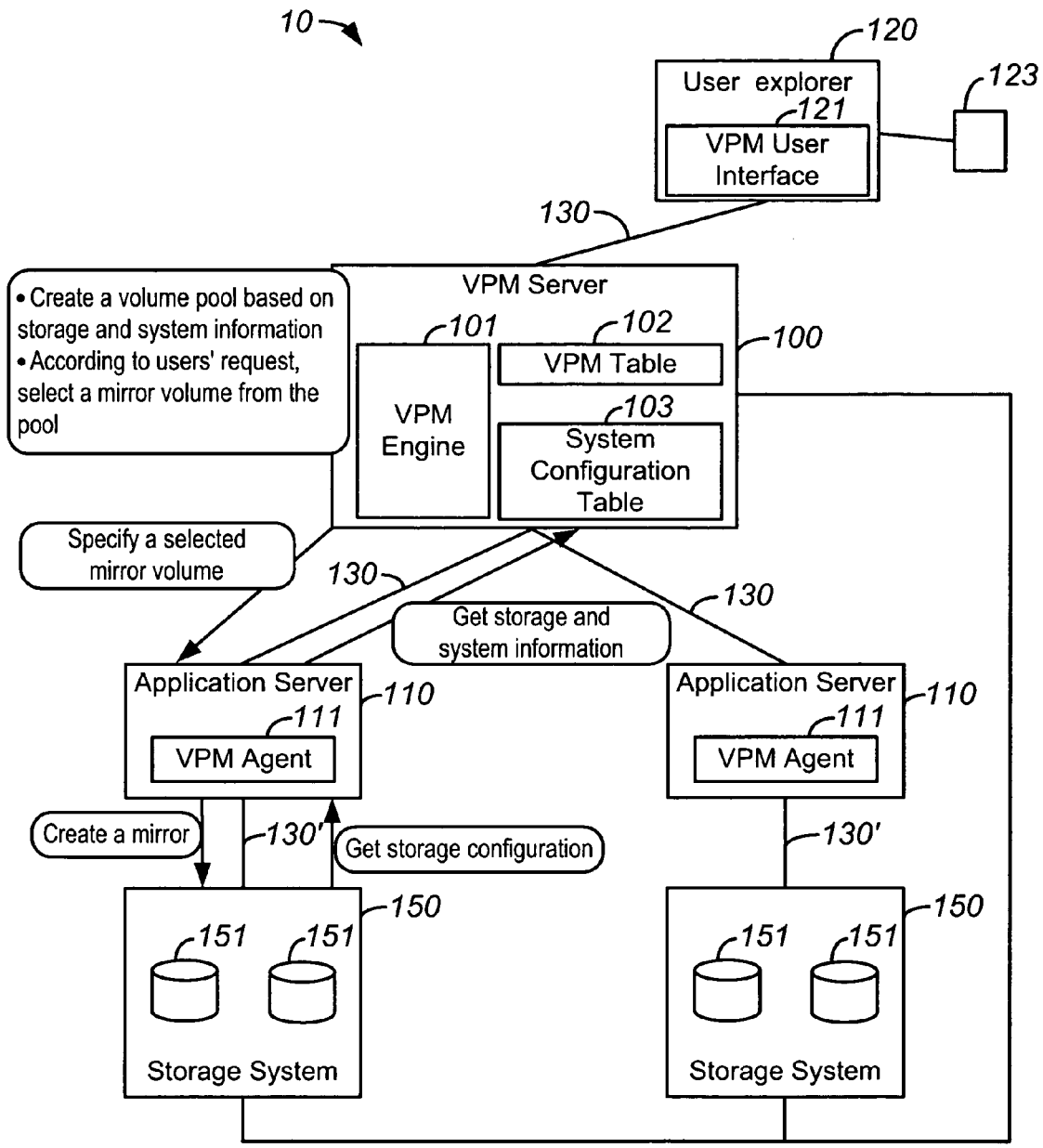
FIG. 1 shows a high level system diagram of a data storage system having a data management component according to an illustrative embodiment of the present invention.

FIG. 1 is a high level block diagram illustrating an embodiment of a data storage management system for managing a volume pool in a data storage system 10, in accordance with the present invention. A volume pool management (VPM) server 100 comprises a VPM engine 101 and various information stores, including a VPM table 102 and a system configuration table 103. In the embodiment shown in FIG. 1, a VPM user interface 121 is provided on a client machine 120. A suitable I/O device 123 provides an information channel to the VPM user interface. The client machine is shown to be in communication with the server via an appropriate communication channel 130; e.g., TCP/IP networking standard.

The VPM server 100 can be any appropriately configured server machine. Typically, the server is a computing device having conventional components such as a CPU (or a multiple CPU configuration), dynamic memory, mass storage capability, and other appropriate hardware components. Alternatively, the server machine can comprise a distributed computing architecture. Still other known architectures might be appropriate, depending on factors such as anticipated system load, performance criteria, and so on.

Software components executing on the VPM server 100 can include an appropriate operating system suitable for servers, such a UNIX OS, and the application software components which collectively provide various functions in accordance with the present invention. The software components can include software modules which comprise machine code, compiled from some high level programming language source code. Software modules can also be interpreted code, for example, Unix shell scripts and the like.

The client machine 120, likewise, can be any appropriate computing machine. The VPM user interface 121 provides a conduit for exchanging information relating to volume pool management between the external environment and the data storage system 10. The VPM user interface can be a single software module which provides the functionality of the present invention. Alternatively, the VPM user interface can be a collection of compiled code, shell scripts, and the like which cooperatively provide the functions according to the invention.

The VPM user interface 121 can manifest itself in any form that facilitates the exchange of management-related information between the external environment and the data storage system 10. For example, the VPM user interface can be a simple command line interface (CLI) presented on a video terminal device as the I/O device 123. Similarly, the VPM user interface can be a graphical user interface (GUI) displayed on an appropriate display device, presenting various graphical elements to allow a user to interact with the data storage management system. In the cases of a CLI and a GUI, the information exchange is typically going to be with a human user as the external environment. However, it is well within the scope of the invention that the external environment can be a machine "user." An appropriate machine interface can be provided to operatively couple the VPM user interface to another machine, or software component. An appropriate application programming interface (API) can be defined to allow administration type software to interact with the VPM user interface, for example. As another example of a machine interface, the I/O device 123 can be a communication channel for communicating with an external machine via an appropriate digital signaling protocol or analog signaling protocol.

The data storage system 10 further includes one or more application servers 110. These can be servers not unlike the VPM server 100, comprising a single computing device and appropriate supporting hardware, or a multi-computing architecture. Communication channels 130 between the VPM server and the application servers can be provided by any of a number of known conventional techniques. The communication channel can be an intranet connection (via ethernet, for example), a wide-area network connection, and so on.

An application server 110 is a conventional server which provides various services for users. For example, an application commonly found in a large enterprise is a database application. Another application can be a logical volume manager which provides a mapping between physical volumes and logical volumes, providing a user with a view of the storage system absent the details of the underlying physical storage structure. Depending on the business, other applications might also be provided.

One or more VPM agents 111 provide certain information about the applications running on one or more application servers 110, and communicate this information to the VPM server 100. In accordance with one embodiment of the invention, there is a VPM agent 111 associated with each application server, though the correspondence between VPM agent and application server can be other than a one-to-one relation.

The information of interest identifies the primary volumes on which instantiations of data sets of an application are stored. A data set (also referred to as application objects and data objects) is an abstract notion which refers to those files which are related to an "object" defined by an application. For example, an instance of a database in a database application would be the "data object" or "application object" and typically might comprise a variety of files which can be stored across multiple primary volumes. As another example, a logical volume presented to a user by logical volume management software would be the "data object." A logical volume may comprise storage space provided by one or more primary volumes. Mapping information provided by a VPM agent 111 identifies or otherwise indicates those primary volumes on which the data object(s) of interest are stored.

Each application can provide the mapping information in its own way. For example, many typical applications have system utilities for accessing this and other administration-type information. An appropriately configured VPM agent 111 can interact with the application to access the mapping information. Other applications may store the mapping information in a configuration table that is stored in a file. In that case, an appropriately configured VPM agent can be created to obtain the information by simply parsing through the contents of the file.

As an example, the database application Oracle® can provide primary volume information for a database instance. Thus, the VPM Agent 111 can obtain tablespace information by issuing the following SQL statements:

```
SQL>SELECT t.name "Tablespace", f.name "Datafile"
2>FROM v$tablespace t, v$datafile f
3>WHERE t.ts#=f.ts#
4>ORDER BY t.name;
Tablespace Datafile
```

Oracle® then returns the following information which can be captured and parsed to obtain the primary volume names:

SYSTEM/vobs/oracle/dbs/tbs_01.f
SYSTEM/vobs/oracle/dbs/tbs_02.f
SYSTEM/vobs/oracle/dbs/tbs_03.f
TBS_1/vobs/oracle/dbs/tbs_11.f
TBS_1/vobs/oracle/dbs/tbs_12.f
TBS_2/vobs/oracle/dbs/tbs_21.f
TBS_2/vobs/oracle/dbs/tbs_22.f
TBS_2/vobs/oracle/dbs/tbs_23.f
TBS_2/vobs/oracle/dbs/tbs_24.f For additional detail, see "Oracle 8i, Backup and Recovery Guide."

Continuing with FIG. 1, the data storage system also includes storage subsystems 150. The configuration shown in the figure is just one of many conventionally used storage configurations. Here, each application server 110 has its own storage subsystem 150. The storage subsystems are connected to the application servers over appropriate communication channels 130. These communication channels can be any appropriate medium suitable for data transfer; e.g., fibre channel using the fibre channel protocol, SCSI (small computer system interface) using the SCSI protocol, and ESCON® and FICON® using the CKD protocol are commonly known examples. As can be seen in the figure, certain information about the storage subsystem that is relevant to the present invention can be obtained by the VPM agent 111 associated with the application server. The kind of information will be discussed further.

The storage subsystem 150 typically comprises one or more physical disks 151 on which the application data is stored. For example, a storage system, such as the storage system produced and sold by the assignee of the present invention known as the Lightning 9900, can have multiple volumes in one or more physical disks. This system comprises four physical disks of 72GB capacity each, and can be configured to contain 24 volumes of 9GB size. In the present invention, a disk 151 refers to a physical disk within the storage system 150, and a "volume" refers to a logical volume that is created out of disks 151 and exposed (made available) to a host by defining a logical address.

Figure 5:
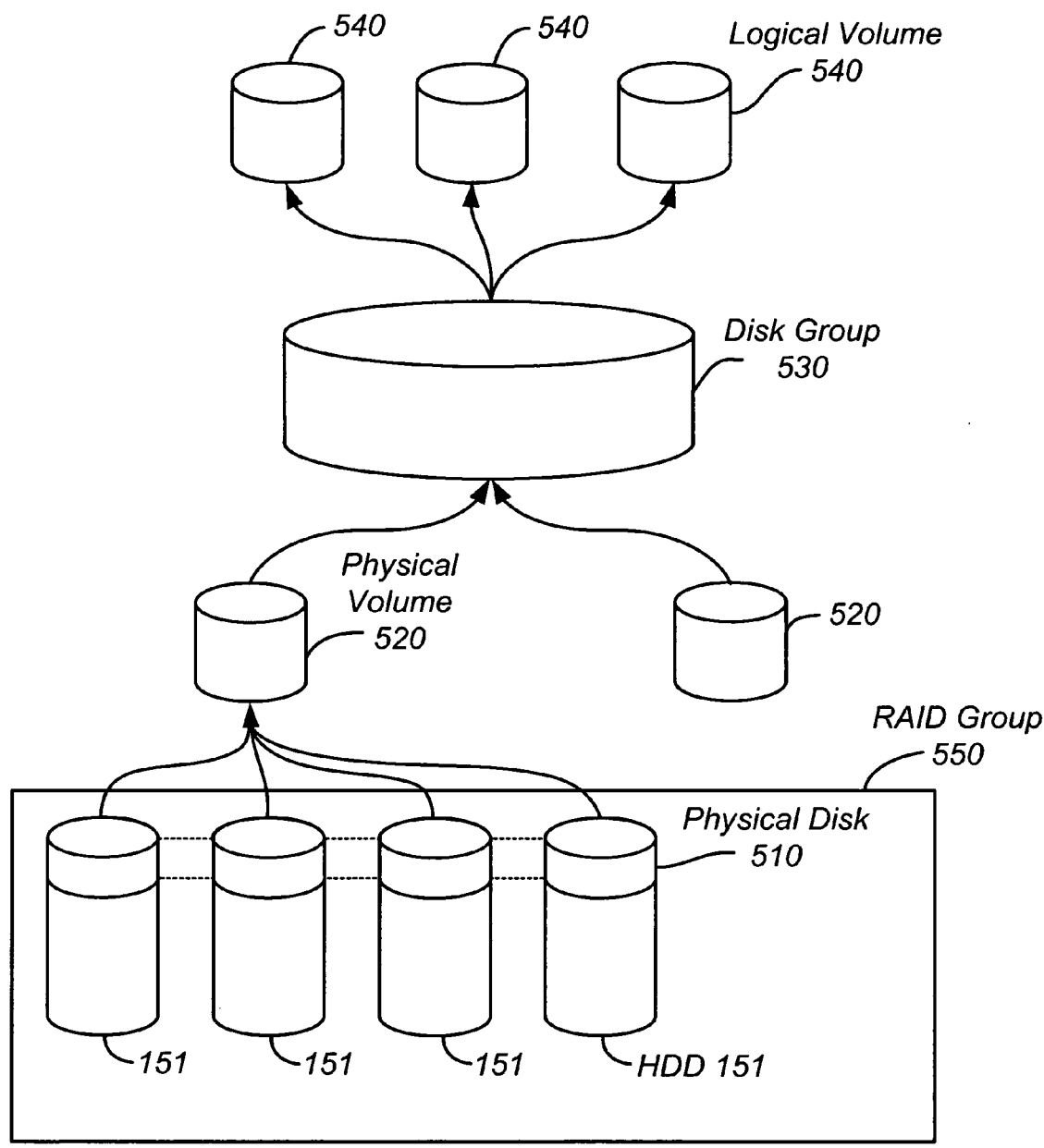
FIG. 5 illustrates an example of a data storage system architecture merely for the purposes of explaining aspects of the present invention.

Refer for a moment to FIG. 5. This figure illustrates a configuration of a data storage architecture suitable to explain aspects of the present invention. It will be appreciated from the discussions that any data storage architecture can be adapted with the components of the present invention. A logical volume 540 is a storage object that is presented to an application. If volume manager software is used, it is created out of a disk group 530. The volume manager software creates the disk group 530 from the physical volumes 520, and creates logical volumes 540 from the disk group. Thus, a logical volume 540 can be viewed as a slice of the disk group 530 and can comprise portions of one or more physical volumes 520, as determined by the volume manager software. If no volume manager is used, each logical volume is in one-to-one correspondence with a physical volume 520.

As noted, a disk group 530 typically comprises a set of physical volumes 520. The volume manager software maps an address on a logical volume 540 to an address on a physical volume 520. Usually this address conversion is transparent for a user and an application. Using this mechanism, the volume manager provides volume management functions like striping and redundancy for higher performance and reliability, and reconfiguring volumes for easy management.

A physical volume 520 is a volume that the operating system recognizes and accesses. To make a physical volume usable, an address has to be associated with the physical volume so that an application server 110 can access it. An addressed physical disk 510 is called a physical volume. A physical volume is sometimes called an LU (Logical Unit).

A physical disk 510 is a unit to be exposed to an application server 110 by assigning an address, and is managed within storage system 150. If a physical disk 510 is exposed, there is a corresponding physical volume 520 on the application server 110. A physical disk 510 may be deployed on one or more HDDs 151 in any manner, the implementation of which depends on the particulars of a given storage system, and is transparent to an application server. Usually the physical disk is uniquely numbered within a storage system.

A RAID group 550 comprises a set of HDDs 151 on which a physical disk 510 is deployed. The RAID group may contain several physical disks. In an embodiment of the present invention, a physical disk can be treated as belonging to one RAID Group 550.

Figure 2:
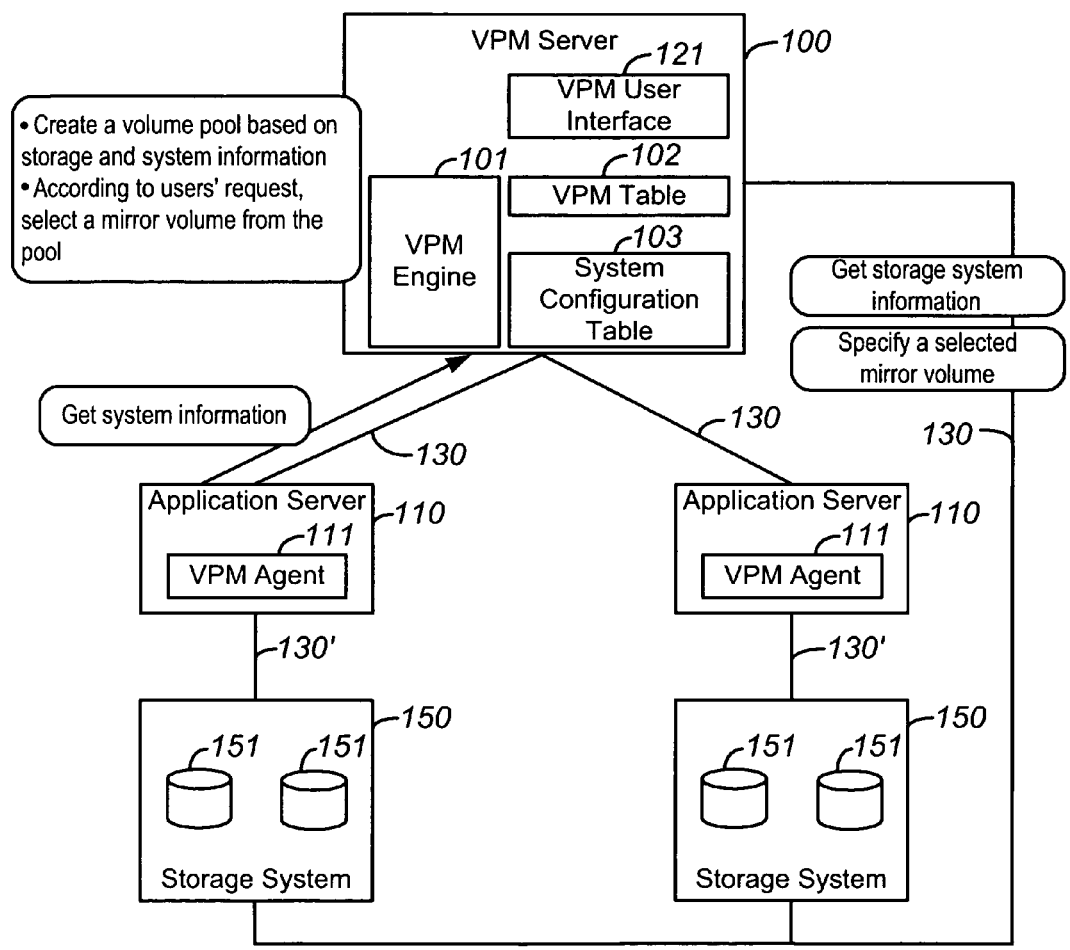
FIG. 2 shows a high level system diagram of a data storage system having a data management component according to another illustrative embodiment of the present invention.

FIG. 2 shows an example of a data storage system 20 according to an alternative embodiment of the present invention. Many of the functional components shown in FIG. 1 comprise software components or modules. It can be appreciated therefore that functional aspects of the present invention can be distributed among the computing components in alternative configurations. For example, as can be seen in FIG. 2, the VPM interface 121 is incorporated in the VPM server 100. FIG. 2 also shows that the VPM server can communicate directly with the storage systems 150 over the network connection 130.

Storage area networks (SAN) can be used to provide the storage facilities for the application servers 110. Thus, storage systems 150 might be different SAN facilities. The network connection 130 from the VPM server 100 can be made to the physical volumes comprising the SAN. In this configuration, the VPM server can access the physical volumes directly. Network attached storage (NAS) architectures can be used and accessed in a similar manner. Consequently, the VPM agent 111 does not need to serve as an interfacing component to the storage system 150 on behalf of the VPM server 100. Instead, the VPM server can directly access the storage systems 150 to obtain the relevant information.

FIGS. 3A–3F show the various data tables which constitute the system configuration table 103 (FIG. 1), according to an illustrative embodiment of the invention. These tables can be initialized by the VPM engine 101.

FIG. 3A shows a server information table 350 which contains certain system-level information. Merely as an example, the server table might include a server name field 351 which contains the name of the server. An IP address field 352 provides the IP address of this server. Depending on the communication protocol, additional addressing-related information might be needed. Other sever information 353 can include a product field and a vendor field.

FIG. 3B shows an entry 300 in an application information table. The application information table is used to provide mapping of an application object (data object) and the primary volumes (physical volumes) on which the files which constitute the application object are stored. The figure shows one entry of the application information table. For each application for which data mirroring is desired, there is an entry for each application object created by that application. Consider a database application. The enterprise may have many databases; e.g., a sale database, a database for the manufacturing group to track parts inventory for manufacturing, and so on. Each database constitutes an application object. Thus, and entry 300 would exist in the application information table for each database that is maintained by the database application.

Each entry 300 includes an application name field 301 which contains information indicative of the application (e.g. Oracle database application) and data object instantiations of the application. An instance identifier field 302 stores information indicative of the data object; e.g. a database. Each entry 300 also can include a mapping information field 303 to store information indicative of the constituent data files of the data object. As discussed above, this information can be obtained in an application-specific manner. Typically such information is available via administrative commands provided by the developer of the application.

FIG. 3C shows a file system information table entry 320. This table maps each file system name to a logical volume, including supporting information which will vary depending on the file system being used. The information can include a "volume name" of the volume on which the file system is deployed. There might be a "mount point" datum which specifies the mount point of the file system; this is relevant, for example, in UNIX-type file system designs. There can be a "version" field indicating a version of the file system. A "total capacity" field and a "used capacity" field can be provided to indicate the disk usage of the file system. In a UNIX system this information can be obtained, for example, by the entering the following command:

df-k filename where filename is the name of a file identified in the application information table of FIG. 3B.

FIG. 3D shows a volume manager information entry 310. The volume manager information table maps a logical volume (540, FIG. 5) to the one or more physical volumes (520, FIG. 5) on which the logical volume resides. A "volume manager name" 311 contains information indicative of the volume management software that is providing the logical volume. A data storage system 10 (FIG. 1) can use volume management software provided by multiple vendors. A "disk group information" field 312 contains information suitable for mapping a logical volume to one or more physical volumes (devices). Thus, for example, the entry shown in the figure shows that the logical volumes "/dev/vx/dsk/VG01/vol01" and "/dev/vx/dsk/VG01/vol02" are defined on the physical volume "c2t0d1," "c2t0d2," and "c3t1d0." There can be two or more "disk group information" fields if several disk groups (530, FIG. 5) are defined on an application server 110. Based on a volume manager information entry 310, a logical volume 540 from a file system information table entry 320 can be mapped to its corresponding one or more physical volumes (520, FIG. 5).

FIG. 3E shows an operating system information table 330. This includes information such as the operating system (field 331) and the OS vendor (field 332).

FIG. 3F shows a physical volume information table entry 340. The physical volume information table contains information suitable to map a physical volume (520, FIG. 5) to a RAID group (550, FIG. 5). Recall that the disclosed embodiments are illustrative. It can be appreciated from the foregoing teachings that physical level devices other than RAID architectures are equally appropriate. Each physical volume information table entry 340 might contain a "volume name" field 341 which contains information indicative of the physical volume. A "physical disk information" field 342 contains information relating to the physical disk (510, FIG. 5) associated with the physical volume. The physical disk information may comprise a vendor name of the storage system 150, storage system (product) name, a serial number of the storage system, a volume ID of the physical disk, a RAID group ID of the RAID group (550, FIG. 5) on which the physical disk is deployed, and a RAID group busy rate. The RAID group busy rate information shows the busy rate of the RAID group. This information can be obtained from the storage system. This information can be monitored periodically and updated in the corresponding physical information table entry 340.

The physical volume information table entry 340 also includes one or more "mirror information" fields 343. Entries are created when a mirror operation is initiated on the physical volume. A "mirror information" entry can include the same information as the "physical disk information" field 342. In addition, the mirror information field includes a "mirror name" that specifies a set of mirrored physical volumes 520. Usually a user defines a set of correlated mirrors (e.g. a set of application objects) and associates a mirror name with it. This allows the user to manipulate the set of mirrors by its mirror name, which is intuitive and understandable. There are as many entries of the "mirror information" fields as there are physical disks (510, FIG. 5) in the physical volume associated with a particular physical volume information table entry 340.

FIG. 4 shows a volume pool management (VPM) table 400 (102, FIG. 1). A volume pool contains a list of the volumes which can be selected for use as mirror volumes. The VPM table stores information relating to the volumes. There can be one or more volume pools from which mirror volumes are selected. Thus, a "volume pool name" field 401 is provided to identify a particular pool of volumes that can be selected as mirror volumes. A "privilege" field 402 defines the privilege settings for accessing the volume pool. For example, the privileges may include settings for the "owner" of the volume pool, members belonging to a user group, and other members; these categories are similar to the user categories typically found in a UNIX system. A setting of "R" permits reference to the volume pool. A setting of "U" permits allocating of volumes from the pool. Of course, additional or alternative privilege arrangements can be provided to control access to a volume pool.

The VPM table 400 further includes an entry 403 for each volume (e.g., physical volume 520 or physical disk 510, FIG. 5) that is a member of the volume pool. Each entry includes a "performance level" indication, a "reliability level" indication, a "vendor name", a "system name" of the disk system, a "serial number" indication, a "volume identifier," a "physical disk group identifier," and a "site name" field. The performance level provides a rough estimate of the performance capability of the disk. The reliability level provides an indication of the reliability of the disk. The site name identifies a geographic location of the disk. Disks which are used as mirror volumes may be located at places separate from the site of the primary volumes. This can be in another room, another building, another city, and so on. Separating the mirror volumes from the primary volumes being mirrored increases the chances of data survival if a catastrophic event occurs at the primary site. Consequently, as will be seen, it may be desirable to select mirror volumes based on their locations. The entry 403 also includes an "in-use" field which indicates if the volume has been allocated as a mirror volume or not.

As noted above, the user interface can be any appropriate interface technique suitable for a particular interfacing situation. An implementation according to an embodiment of the invention is a command line interface. For example, a UNIX-style command line interface may include commands such as the following:

| | |
|---|---|
| createmirror | mirror[HD —name<br>[-vol pvol1 [pvol2 ... pvoln]]<br>[-app appname instname]<br>[-host hostname]<br>[-pool pool_name]<br>[-plevel performance_level]<br>[-rievel reliability_level]<br>[-site sitename] | createmirror initiates a mirroring operation of the specified primary volumes. This command initiates selection of mirror volumes from a volume pool (FIG. 4) to be used as mirror volumes to mirror the one or more primary volumes. A mirror name specifies the group of mirror volumes. The command arguments (options) include:

-vol: This argument allows the user to identify specific primary volumes to be mirrored. One or more primary volumes (pvol1–pvoln) can be specified.

-app: This argument allows a user to specify an application (e.g., database application, volume manager, etc.) and an instance of a data object ("instname") associated with the application. This argument initiates a mapping of the data object to one or more primary volumes. A mirroring operation is then performed on the mapped primary volumes. The nature of the data object will depend on the application. For example, the command:

createmirror -app Oracle PROD1 specifies Oracle as the application, which is a database application. Consequently, the data object is a database named PROD1. As another example, the command:

createmirror -app VxVM VG01 specifies VxVM as the application, which is a volume management application, and so the data object in this case is a logical volume. The command, can be implemented to understand how to make the translation from data object to primary volumes, by making a simple lookup for the application type and then accessing specific software routines or the like to access the mapping information to map the data object to the primary volume. As discussed above, an SQL sequence can be issued in Oracle to obtain the primary volume information. In VxVM, an administrative command such as vxprint can be issued to the VxVM administration software to obtain the primary volume information for the specified logical volume.

-host: This argument allows the user to specify a host name where the specified primary volumes reside. For example, in FIG. 1, this argument can be used to specify which of the application servers 110 contain the primary volumes to be mirrored. A default host can be used; for example, the machine on which the user is logged on can be a default host.

-pool: This argument allows the user to specify a volume pool from which the mirror volumes are selected. If this argument is not specified, a default volume pool is used.

-plevel: This argument allows a user to specify a particular performance level (criterion) of the mirror volume(s) to be used to mirror the primary volume(s). If this argument is not specified, then mirror volumes are selected irrespective of the performance level.

-rlevel: This argument allows a user to specify a particular reliability level (criterion) of the mirror volume(s) to be used to mirror the primary volume(s). If this argument is not specified, then mirror volumes are selected irrespective of the reliability level.

-sitename: This argument allows a user to specify a particular sitename (criterion) from which the mirror volume(s) are to be selected to mirror the primary volume(s). If this argument is not specified, then mirror volumes are selected irrespective of the location of the mirror volume.

It can be appreciated that other criteria can be included. The listed criteria illustrate the fact that selection of mirror volumes can be driven by user-specified criteria.

| suspendmirror | mirror_name [-host hostname] |
|---|---| suspendmirror halts the mirroring operation of all the mirror volumes in the mirroring group identified by mirror_name. Unlike the command delmirror, this command simply halts the mirroring operation, but does not return the halted mirror volumes back to the volume pool. The command arguments (options) include:

-host: This argument allows the user to specify a host name where the mirroring operation is to be halted. For example, in FIG. 1, this argument can be used to specify which of the application servers 110 contain the primary volumes to be mirrored. A default host can be used; for example, the machine on which the user is logged on can be a default host.

| delmirror | mirror_pname [-host hostname] [-pool poolname] |
|---|---| delmirror halts the mirroring operation for all the mirror volumes in the mirroring group identified by mirror_name. In addition to halting the mirroring operation, this command returns the halted mirror volumes back to the volume pool, allowing those mirror volumes to be allocated to mirror other primary volumes. The arguments include:

-host: This argument allows the user to specify a host name where the mirroring operation is to be halted. For example, in FIG. 1, this argument can be used to specify which of the application servers 110 contain the primary volumes to be mirrored. A default host can be used; for example, the machine on which the user is logged on can be a default host.

-pool: This argument allows the user to specify the volume pool to which the halted mirror volumes are returned. If this argument is not specified, the mirror volume(s) can be returned to a default volume pool associated with the user.

poolcreatepool_name poolcreate creates a volume pool having the specified pool name. This command simply creates an entry in the VPM table 400 (FIG. 4).

poolattr pool_name grpname [+|–] [R|U|RU]]

poolattr changes the group attributes for the group identified by "grpname" for a volume pool having the specified pool name. The user specifies "+" or "–" to respectively add or delete the privilege of reading (R), allocating (U), or both. This command changes the privilege field 402 in the VPM table 400 (FIG. 4).

pooladdvol pool_name [+|–] vol1 [vol2 . . . voln]

pooladdvol adds a volume to the volume pool specified by the pool name. One or more volumes (vol1–voln) can be added.

In the particular implementation according to an embodiment of the invention, the volume is a physical volume 520 (FIG. 5). The user can specify "+" or "–" to respectively add or delete the specified volumes.

Figure 6:
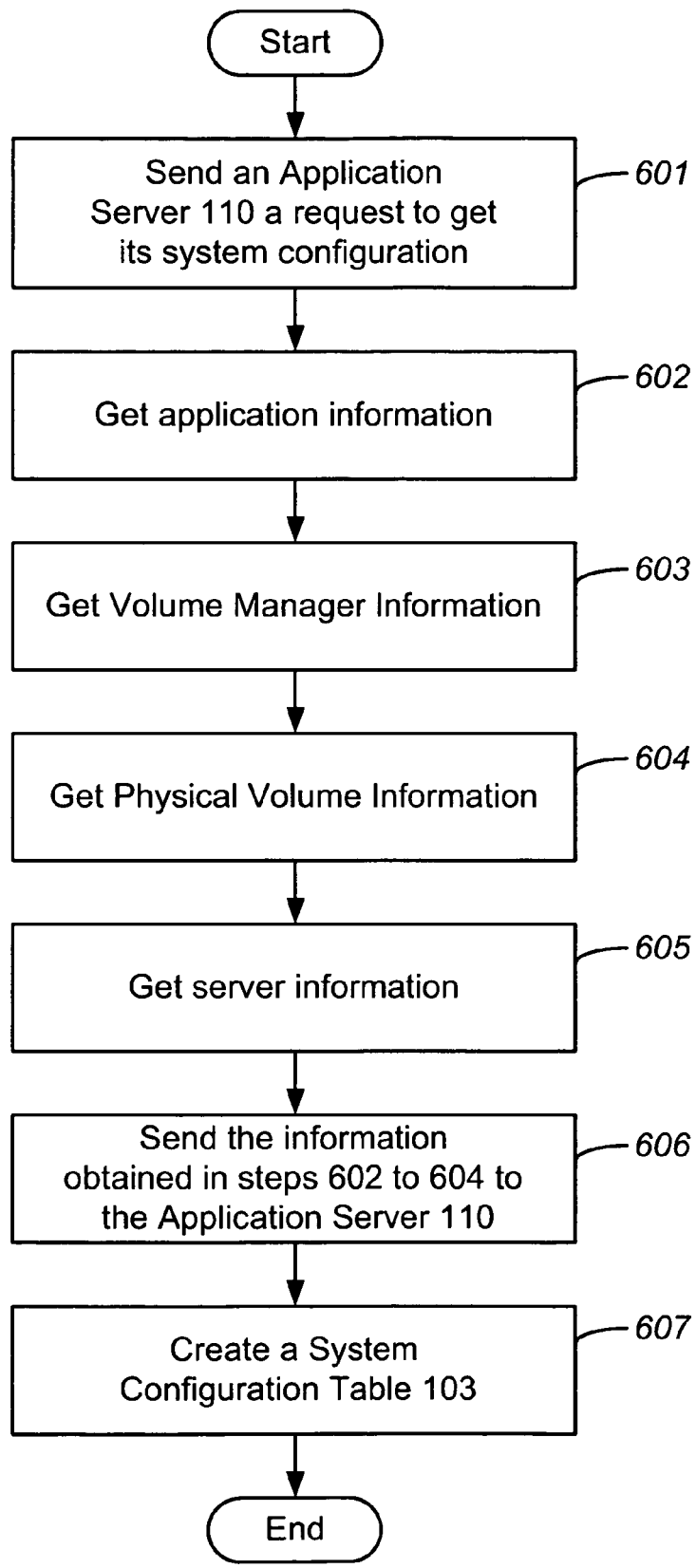
FIG. 6 is a high level generalized flow chart illustrating an example of the processing steps for creating the system configuration table shown in FIGS. 3A–3F.

FIG. 6 shows a high level flow diagram illustrating how the system configuration table 103 (FIG. 1) can be initialized. When the VPM engine 101 starts up, a message is sent to all application servers 110 in a step 601 to obtain their respective system configuration information. In addition, when the VPM engine is informed of newly added application server 110, it will send a message to that application server to obtain its system configuration information.

In each application server 110, information about applications running on the server is obtained in a step 602 by the VPM agent 111. This can be achieved in any of a number of ways, such as CLI or an API, and is heavily dependent on the application. Applications include software such as Oracle, SQL Server, Exchange, SAP R/3, People Soft, BAAN, and so on. As mentioned above, information of interest includes some form of mapping information that identifies primary volumes which are used to store a particular data object or application object for an application; e.g., a database. Thus, for example, mapping information for each instance of a database (data object) maintained by a database application in an application server is obtained, identifying all the primary volumes used to store the data files associated with that database instance.

In a similar step 603, a VPM agent 111 can obtain information about a volume manager, if one is running on the application server 110. A typical volume management product is the Veritas Extended Volume Manager (VxVM). As in step 601, volume manager information can be obtained in a manner provided by the software. Thus, to obtain mapping information which identifies the primary volumes comprising a logical volume, the vxprint command can be used. The VPM agent 111 can be configured to interact with VxVM to appear as a user typing in the vxprint command and receive the output. The output can then be parsed to obtain the desired information.

Next, in a step 604, information about the physical volumes (e.g., Physical Disk Information 342, FIG. 3F) which can be accessed by the application server 110 is obtained. This can be achieved in a manner appropriate for the particular storage system 150. For example, a SCSI interface can-receive SCSI command such as inquiry to obtain the information. As another example, a network protocol such as SNMP might be suitable. Some storage system vendors provide CLIs and APIs to access the information. In any case, a VPM Agent 111 can be programmed or otherwise configured to interact with the storage system to obtain the information.

In a step 605, information about the server itself is obtained. The information includes such things as the file system, the operating system, and so on. The information can be obtained using CLIs or APIs.

In a step 606, the information obtained in steps 602–605 is communicated to the VPM engine 101 by each application server 110. The VPM engine 101, in a step 607, collects the information received from each application server 110, compiles the data, and populates the system configuration tables shown in FIGS. 3A–3F with the data.

Figure 7:
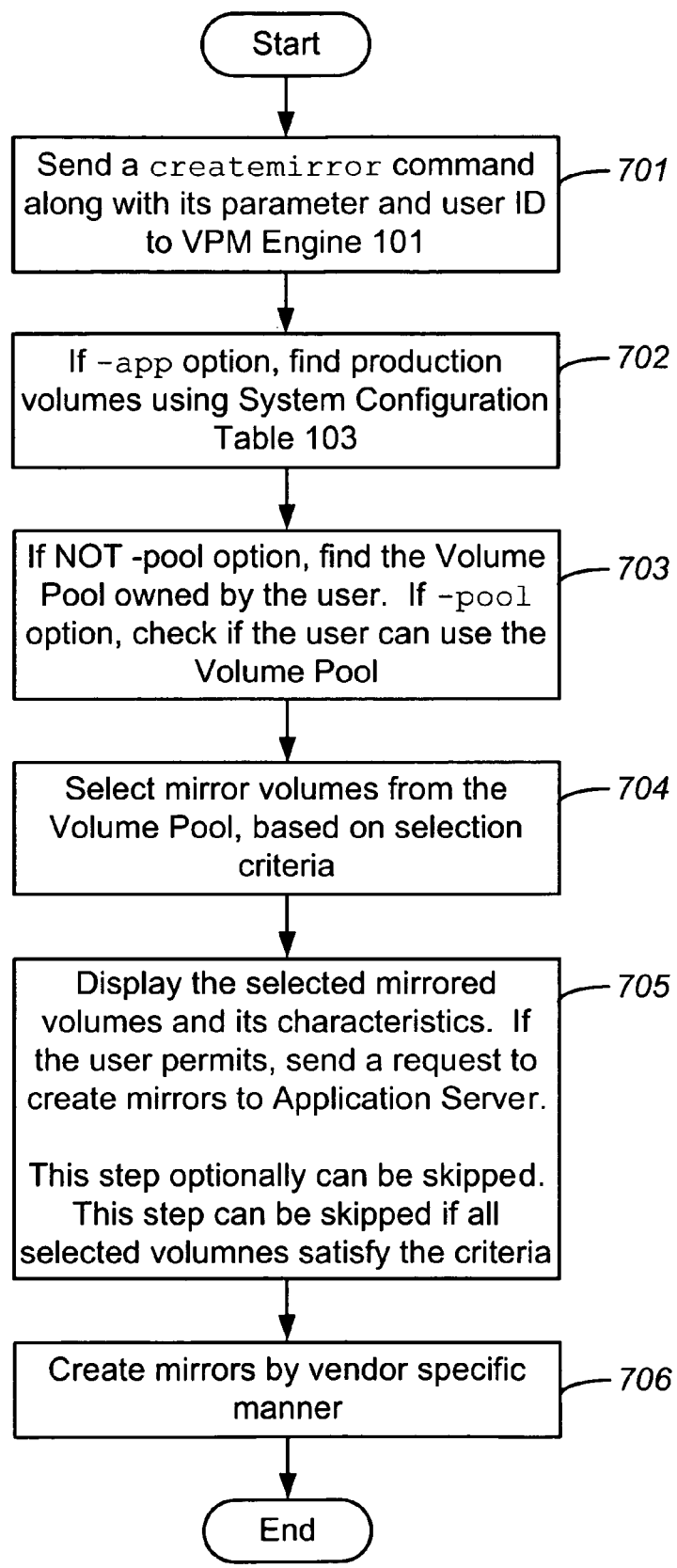
FIG. 7 is a high level generalized flow chart illustrating an example of the processing step for initiating a mirror operation in accordance with embodiments of the present invention.

FIG. 7 shows a high level flowchart illustrating how mirror creation can be achieved in a particular implementation according to an embodiment of the invention. When information indicative of the createmirror command is received by the VPM server 100 (FIG. 1) from the VPM user interface 121 (FIG. 1, 2), that information and accompanying parametric information (e.g., command arguments) is communicated to the VPM engine 101 in a step 701. Parametric information can include identification information of the user which would be useful to determine default values. The VPM engine examines the information to iden-tify the parametric information; e.g. by parsing the command line to identify the arguments.

In a step 702, if the -vol argument is specified, then the a list of primary volumes is provided in the parametric information. However, if the -app argument is specified, then the VPM engine 101 obtains a list of information identifying the primary volumes on which the specified application object is stored by referencing the system configuration tables (FIGS. 3A–3F).

Given the name of an application object is given, the VPM engine 101 can find logical and physical deployment of that object. Referring to the sample information shown in FIGS. 3A–3F for example, if the application object (tablespace TBS1) is given, the deployment of TBS1 can be found in the following manner:

From the application information entry 300, it can be seen that TBS1 comprises two files named /u01/ora/data/tbs01.ora and /u01/ora/data/tbs00.ora. Using an appropriate CLI or APIs, the logical volume 540 on which the two files reside can be determined; for example by issuing the command:

df-k/u01/ora/data/tbs01.ora

Assume that both files are on /dev/vx/dsk/VG01/vol01.

From the volume manager information entry 310, the logical volume 540 of /dev/vx/dsk/VG01/vol01 is shown to be on three physical volumes 520, namely, c2t0d1, c2t0d2, and c3t1d0. From the file system information entry 320, the logical volume 540 of/dev/vx/dsk/VG01/vol01 is mounted on /u01/ora/data/ and uses VxFS file system. From the physical volume information table 340, the physical volumes 520 of c2t0d1 is on a storage system called "High-End Storage" from a company called Storage Co. (both being fictitious names, used merely for explanatory purposes), Serial Number 60233, and Physical Disk Group ID 200.

In a step 703, the VPM engine 101 obtains a set of candidate mirror volumes from a volume pool. If the -pool argument is not specified, then a default volume pool is accessed.

This can be accomplished by matching the user ID against the "name" field in the volume pool management table (FIG. 4). Otherwise, the parametric information includes a volume pool name, identifying the volume pool from which the candidate mirror volumes are selected. An initial confirmation of sufficient privileges can be made before actually allocating mirror volumes from the user-specified pool.

In a step 704, the candidate mirror volumes are selected for each primary volume. If any of the criteria arguments are specified (e.g., performance, reliability, sitename), then only those mirror volumes with matching criteria will constitute the volume pool from which the candidate mirror volumes are selected. The following criteria are considered in a particular implementation of an embodiment of the invention, involving RAID systems. It can be appreciated that additional or alternative considerations might be appropriate for other disk architectures, and that these criteria are presented for explanatory purposes only to illustrate how mirror volumes can be selected.

(35) The mirror volume 520 (or physical disk 510, FIG. 5) should not be in the same RAID Group that contains the primary volume. This restriction is facilitated in the system configuration table 103 by examining the RAID Group ID field in the physical disk information 342.

(25) The mirror volume should not be in a RAID Group which is busy. Again, this restriction is facilitated in the system configuration table 103 by examining the RAID Group Busy rate in the physical disk information 342.

(15) Where the -plevel and -rlevel arguments are provided, the mirror volume should satisfy the specified performance level and reliability level.

(10) Where the -plevel and -rlevel arguments are not provided, the mirror volume should have as close to the same performance and reliability level as the primary volume being mirrored.

(5) The mirror volume should not be in RAID Group that contain another primary volume.

Another consideration for mirror volume selection is to apply a weighting to each of the above-listed criteria. The VPM engine 101 can attempt to select the best mirror volume that satisfies all of the conditions. If it cannot, however, then it selects the next best volume. One approach is to produce a score for each available volume by summing the weightings of the criteria that are satisfied by that volume. The volume having the highest score is selected as a candidate volume.

When all the candidate volumes are selected, the list along with characteristic information of each candidate volume can be communicated to the user for approval, in a step 705. The list of candidate mirror volumes includes information that associates each candidate with a primary volume. It can be appreciated now why the mirror volume is a "candidate" volume, since an approval from the user might be required.

The VPM engine 101 can be configured to selectively require an approval response from a user. For example, if the score for a candidate volume exceeds a threshold, it may be decided by design that no approval is required. The threshold could be set by the user via an argument to the command. Another technique might be to provide an argument that specifies whether approval is needed or not.

If an approval response to the candidate volumes is received, then in a step 706, the VPM engine 101 communicates to the VPM agents 111 information to begin mirroring operations. Each VPM agent 111 communicates with the storage system 150 to initiate mirroring of the primary volumes associated with the application server 110 using the assigned mirror volume. In other configurations (e.g., FIG. 2), the VPM engine itself might communicate with the storage systems to initiate mirroring operations.

For each of the mirror volume its associated "in-use" field (FIG. 4) is set to a value indicative of being in use, so as not be allocated. Finally, the allocated mirror volumes are added to a mirroring group of active mirror volumes identified by the "mirror_name" parameter.

Figure 8:
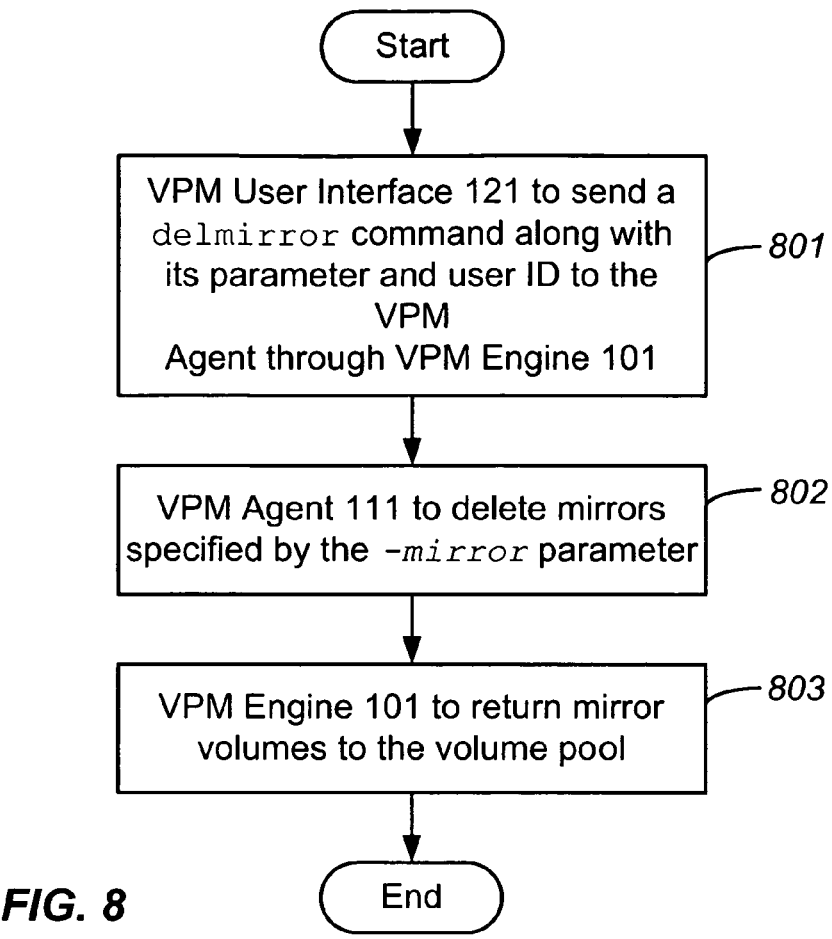
FIG. 8 is a high level generalized flow chart illustrating an example of deleting mirror in accordance with embodiments of the present invention.

FIG. 8 is a high level flow chart illustrating how a mirroring group can be deleted. In a step 801, the VPM engine 101 receives from the VPM user interface 121 information indicative of a command to delete a mirroring group which is a group of mirror volumes engaged in mirroring operations. In a step 802, an application server 110 containing the mirror volumes to be deleted receives the command from the VPM engine. If the -host argument is specified, mirroring on the application server identified by the host name is halted. The VPM agent 111 interacts with the storage system 150 to halt the mirroring operation. In other architectures (e.g., FIG. 2), the VPM engine itself might interact with the storage system to halt mirroring operations.

In a step 803, the VPM engine 101 "returns" the mirror volumes to a volume pool. If the -pool argument is not specified, then the mirror volumes are "returned" to the volume pool from which they were originally allocated. Thus, in accordance with the particular disclosed implementation, the "in-use" field associated with each returning mirror volume is set to indicate that it is available to be re-allocated in a createmirror command.

If the -pool argument is specified, then the mirror volumes are returned to the volume pool specified by the pool name. This requires appropriate access by the user to the specified volume pool. If access is permitted, the volume entries 403 in the VPM table 400 that presently contains the mirror volumes are moved to the VPM table specified by the user; which includes deleting the entries from the former VPM table.

Mirror volumes can be used for various solutions, such as backup and recovery, disaster recovery, creating a duplicate database, etc. Some database systems and volume manager software allow a user to dynamically change the configuration of a data object. For example, a volume manager can reconfigure it's disk group 530 (FIG. 5) by the addition of one or more physical volume 520. Consequently, the newly added physical volume(s) must be mirrored. Otherwise, the Disk Group 530 on the mirror volumes cannot be reconfigured or accessed by an Application Server 110.

Figure 9:
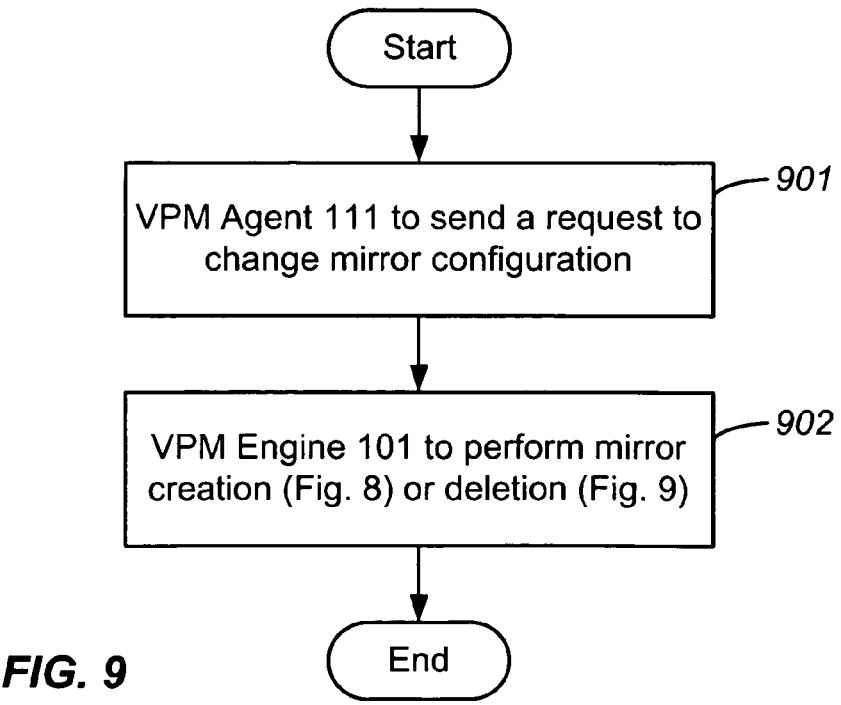
FIG. 9 is a high level generalized flow chart illustrating system table updating when the data storage configuration has changed.

When a configuration change occurs in an application server the event can be detected by an appropriately configured VPM agent 111. FIG. 9 shows how the VPM server 100 can be updated. In a step 901, a VPM agent detects a configuration change that can have an affect on volume mirroring operations, such as added or removed primary volumes, or added or removed mirror volumes. In an alternative architecture, the VPM server itself may be able to detect the event. When such an event is detected, the VPM agent can communicate information indicative of the event to the VPM engine 101, in a step 902. The VPM engine can then perform foregoing described operations to make the necessary updates to the various tables shown in FIGS. 3A–3F.

Figure 10A:
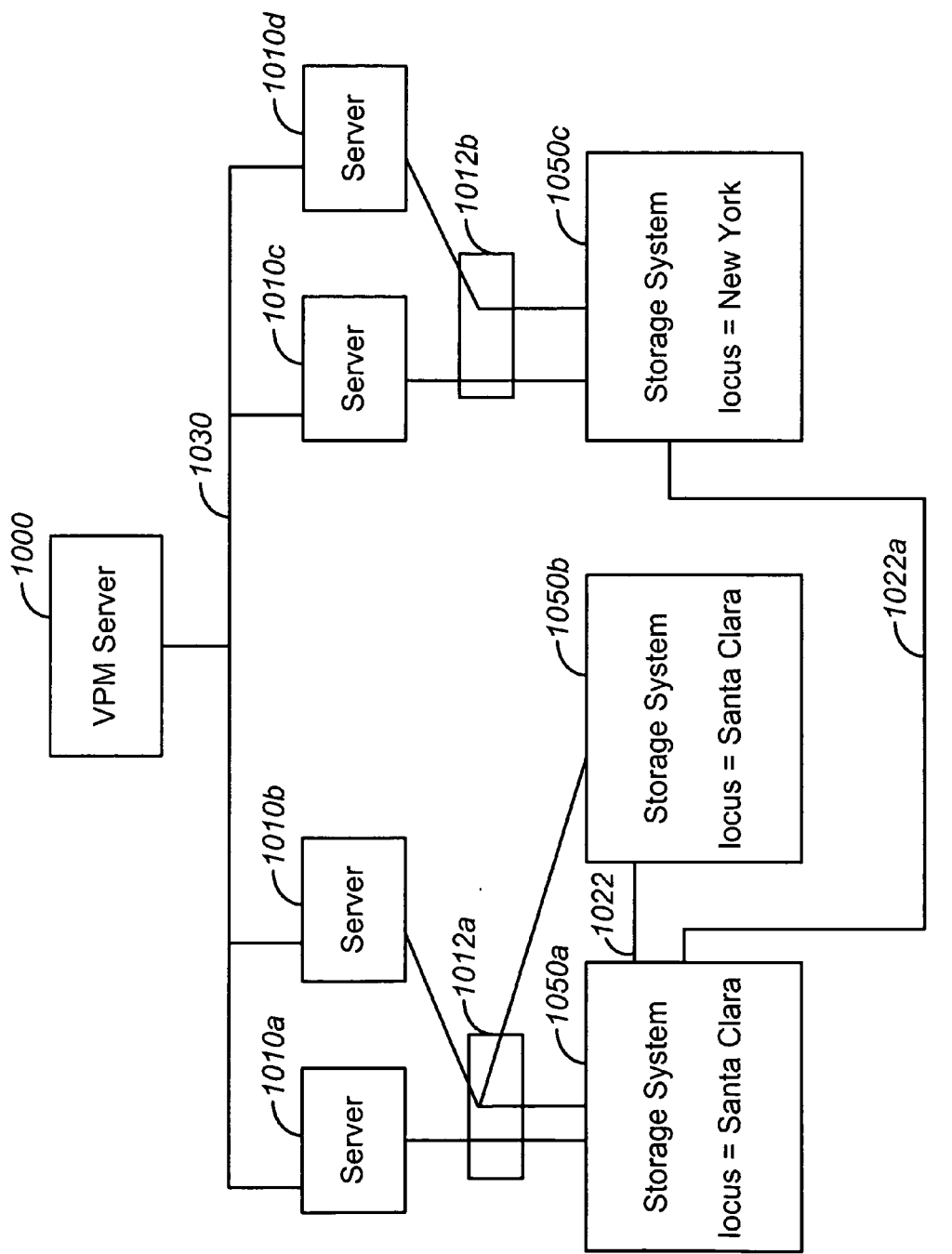
FIGS. 10A–10C show example configurations of remote copy architectures having a data management component according to an illustrative embodiment of the present invention.
Figure 10B:
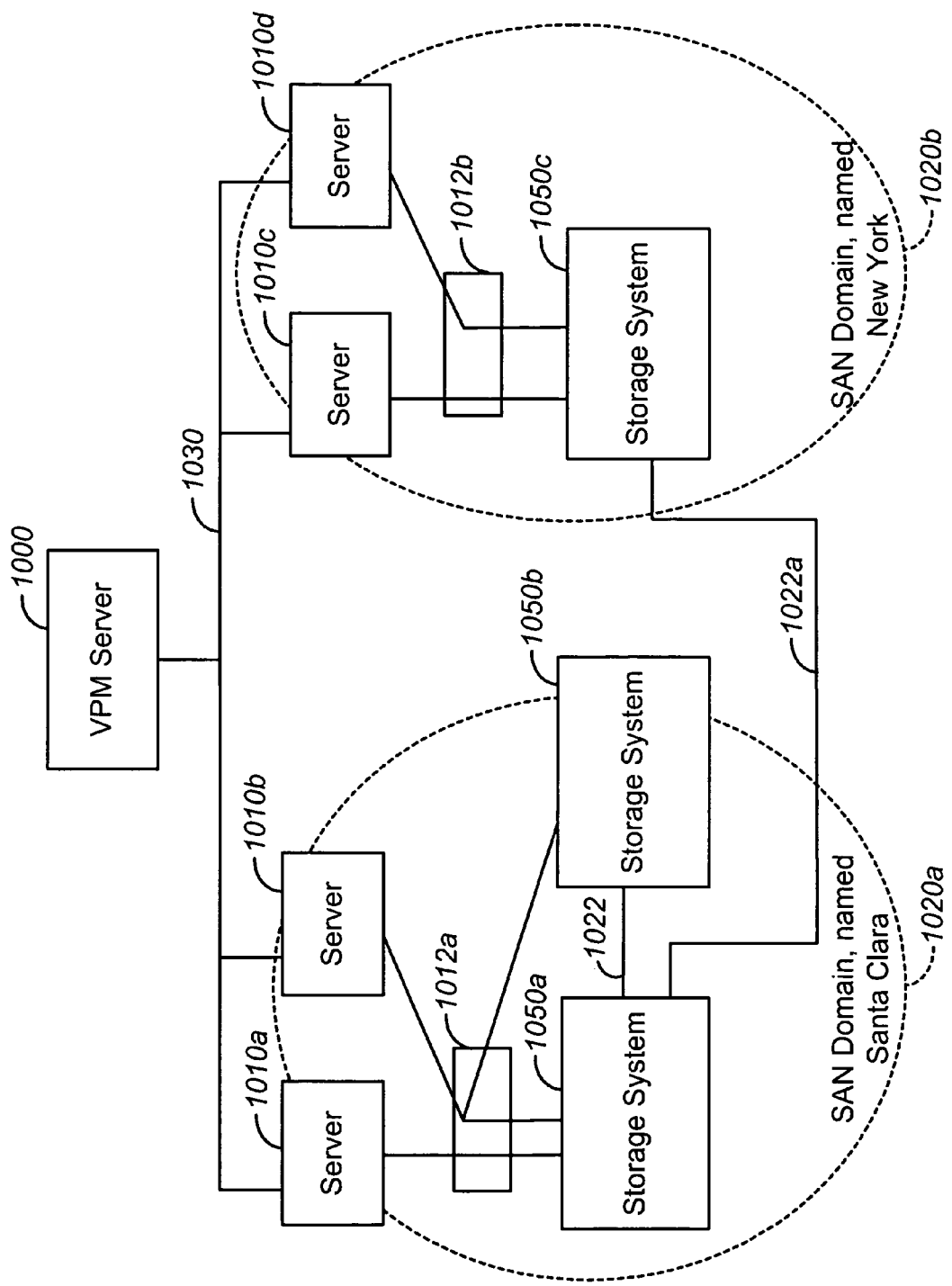
Figure 10C:
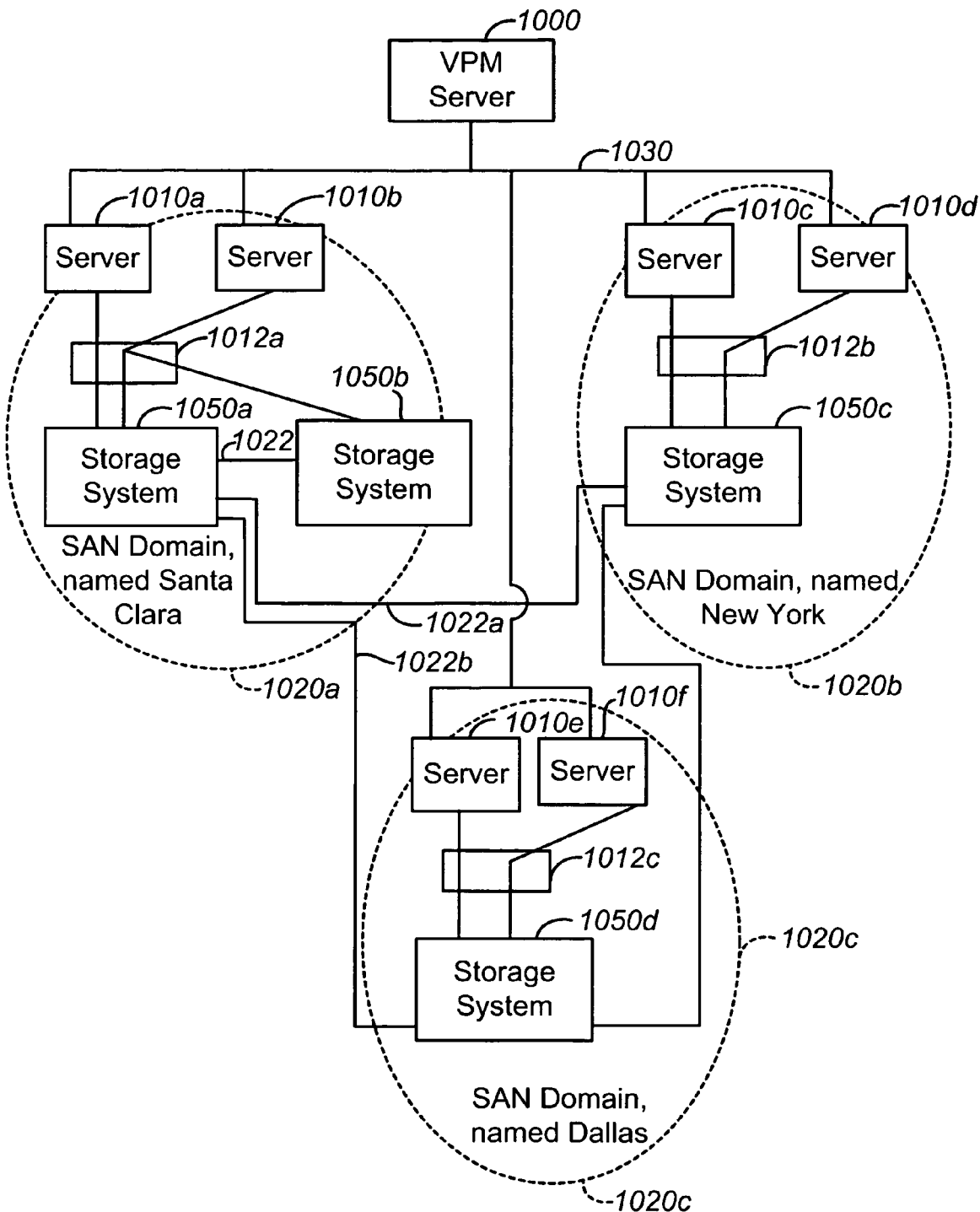

FIGS. 10A–10C show example configurations of generalized remote copy architectures, to illustrate a further aspect of the present invention. In accordance with the present invention, there is introduced the notion of a "SAN domain" of storage volumes when discussing the following remote copy architectures and similar storage configurations. A more general term might be "locus" (or "set" or "domain") to emphasize that the volumes are grouped together based on some criterion (or a two or more criteria). For example, volumes within a geographical area may be grouped together. The group might be identified by a common location identifier; e.g., volumes within a city might all be grouped together. However, particular implementations in accordance with the present invention treat volumes that share a common set of servers as a domain, herein sometimes referred to as a SAN domain; e.g. FIG. 10C shows three SAN domains.

FIG. 10A illustrates such a configuration. The storage architecture shown in the figure includes a VPM server 1000 in communication over suitable communication media 1030 to a plurality of servers 1010a–1010d. A suitable switching component 1012a can be provided to operate with the servers 1010a and 1010b to provide data communication with one or more primary (production) storage systems (volumes). The figure illustrates in this example that the switch 1012a can switch between two storage systems 1050a and 1050b. In particular, server 1010a can access storage system 1050a, while server 1010b has access to storage systems 1050a and 1050b. In addition, it can be seen that the storage systems 1050a and 1050b are co-located; in this case they are co-located in a city called Santa Clara. Similarly, servers 1010c and 1010d can be connected to a switching functionality 1012b for data communication with one or more primary storage systems. In the illustrative example shown in FIG. 10A, the servers 1010c and 1010d have one primary storage system 1050c located in a city called New York.

Remote copy links 1022 and 1022a provide the data channels across which the remote copy functionality is provided. Thus, for example, FIG. 10A indicates that the storage system 1050a serves as the primary volume for server 1010a. A remote copy link 1022 is provided to storage system 1050b, so that data I/O activity occurring in storage system 1050a can be mirrored in storage system 1050c. A second remote copy link 1022a is provided to storage system 1050c. This second link also allows mirroring to occur between storage system 1050a and 1050c. For example, the storage system 1050c might use storage system 1050a as its remote copy site.

In accordance with the implementation specifics of the configuration shown in the figure, each storage system includes a "locus identifier." In the example shown, the locus is location information such as a city. It can be appreciated, however, that a locus of volumes can be defined by something other than location in a city. A locus of volumes can be volumes located in a data storage facility; the group of volumes could be identified by the name of the building housing the facility or by some other sufficiently descriptive identifier. A locus can be based on any criterion which identifies the volumes as belonging together. It is noted that a locus can be defined totally arbitrarily, having nothing to do with geographic location, functionality, etc. It can be appreciated, of course, that actual implementations are likely to use practical grouping criteria such as location.

FIG. 10B shows a SAN domain 1020a comprising servers 1010a and 1010b, and storage systems 1050a and 1050b. A switching component 1012a can be included to provide access between the servers and the storage systems. Another SAN domain is shown, comprising servers 1010c and 1010d in data communication with a storage system 1050c via switch 1012b. Remote copy links can be provided within a SAN domain, such as link 1022, and between SAN domains, such as link 1022a.

Unlike the storage systems shown in FIG. 10A, the storage systems of FIG. 10B are not configured to store locus information. In such a situation, the VPM server 1000 can be configured, as will be discussed below, to define domains (also referred to as SAN domains). This is a grouping of volumes that are related by some criterion.

FIG. 10C shows yet another example of a larger storage configuration than is shown in FIG. 10B, illustrating how the architecture can scale. A third SAN domain 1020c is provided. Additional remote copy links 1022b and 1022c are provided between SAN domains 1020a and 1020c and between 1020b and 1020c, respectively. One can readily appreciate that with even larger installations, extending across cities, states, countries, continents, worldwide (and someday beyond), managing the sites can become overwhelming.

Figure 11:
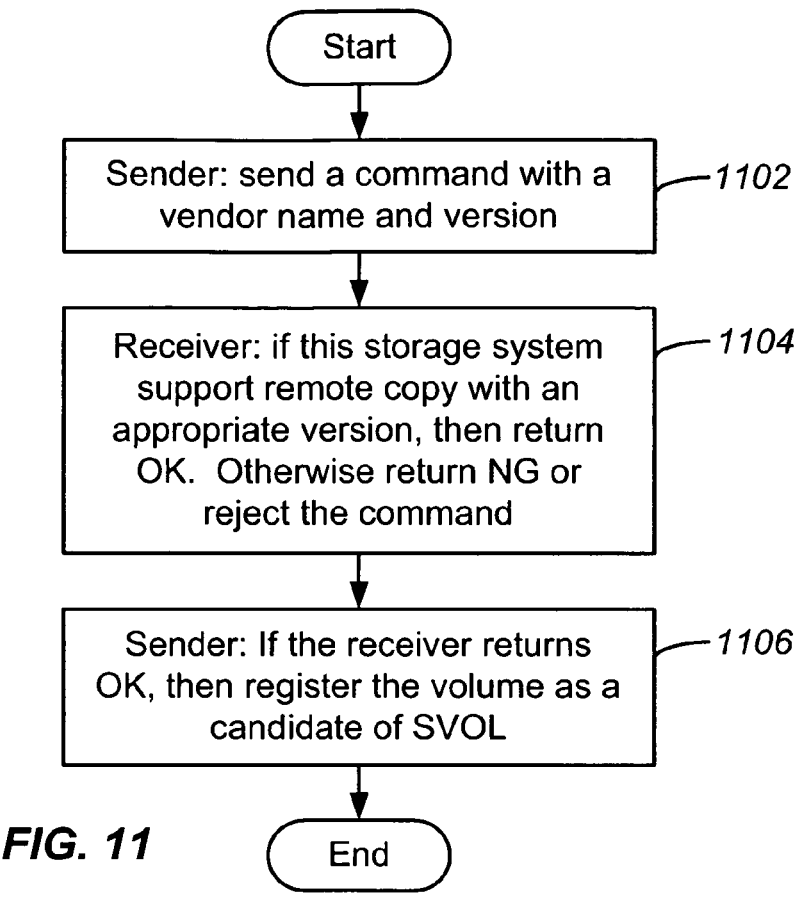
FIG. 11 shows the general steps for querying a storage system.

FIG. 11 is a flow chart highlighting the steps for determining the remote copy connection topology among the storage systems shown in FIGS. 10A–10C. In a step, 1102, a storage system (e.g., 1050a), designated as a sender, interacts with another storage system (e.g., 1050c), designated as a receiver to determine information relating to the remote copy functions available. The information may include vendor, firmware information, and remote copy capability. The communication can be accomplished by connection a port (sometimes referred to as an initiator port) provided on the sender side. The sender communicates through that port to the receiver. It can be appreciated that other storage systems may be configured with different hardware and software to provide similar functionality. One of ordinary skill in the art can readily adapt such systems accordingly to practice the present invention.

In a step 1104, the receiver checks if it its remote copy function is compatible with that of the sender. If it is, then an affirmative indication is transmitted back to the sender. Otherwise, a negative response is transmitted back to the sender. If the sender receives an affirmative response (step 1106), the sender then communicates this fact to the VPM server 1000. These steps are performed for all storage volumes having this capability. The steps can be repeated on a periodic basis in order to remain up to date in case volumes are added or removed from the system. This connectivity information is collected by the VPM server 1000 and can be displayed to the user in a suitable manner.

In accordance with an embodiment of the invention, storage systems can be provided which allow a user to define a locus of volumes (SAN domain) by storing locus-identifying information in the storage system. The processing highlighted in FIG. 11 produces information showing which storage systems are connected. In FIG. 10A, for example, the user will know that the storage system 1050a in Santa Clara has a connection (for remote copy processing) to a storage system 1050c in New York.

This information allows the user to manually define domains. For example, referring again to FIG. 10A, the storage systems 1010a and 1010b are shown located in Santa Clara. The user may decide that these storage systems comprise a domain. The identifier "Santa Clara" can be inserted into some memory store in each storage system. Typically, the storage system will have some interface means for allowing a user to supply such information, either remotely or directly. The location information might include:

a unique name of the location ; e.g., city name, department name, etc.

an address of the location where the storage system is located a name of the sysadmin responsible for managing the locus of volumes an e-mail address and phone number of the sysadmin etc.

Such storage systems have the capability of storing the information locally, and providing that information to the VPM engine component 101 (FIG. 1) of the VPM server. Storage systems that have the same locus name are considered, in accordance with the invention, to be in the same locus.

In an embodiment where storage systems (e.g., 1050a, 1050b, etc.) do not have the capability of storing local identification information that can be uploaded to the VPM server, a SAN domain can be defined manually. In that case, the VPM server can provide an interface that allows a user to define a SAN domain and to assign storage systems as belonging to a particular SAN domain.

Figure 12:
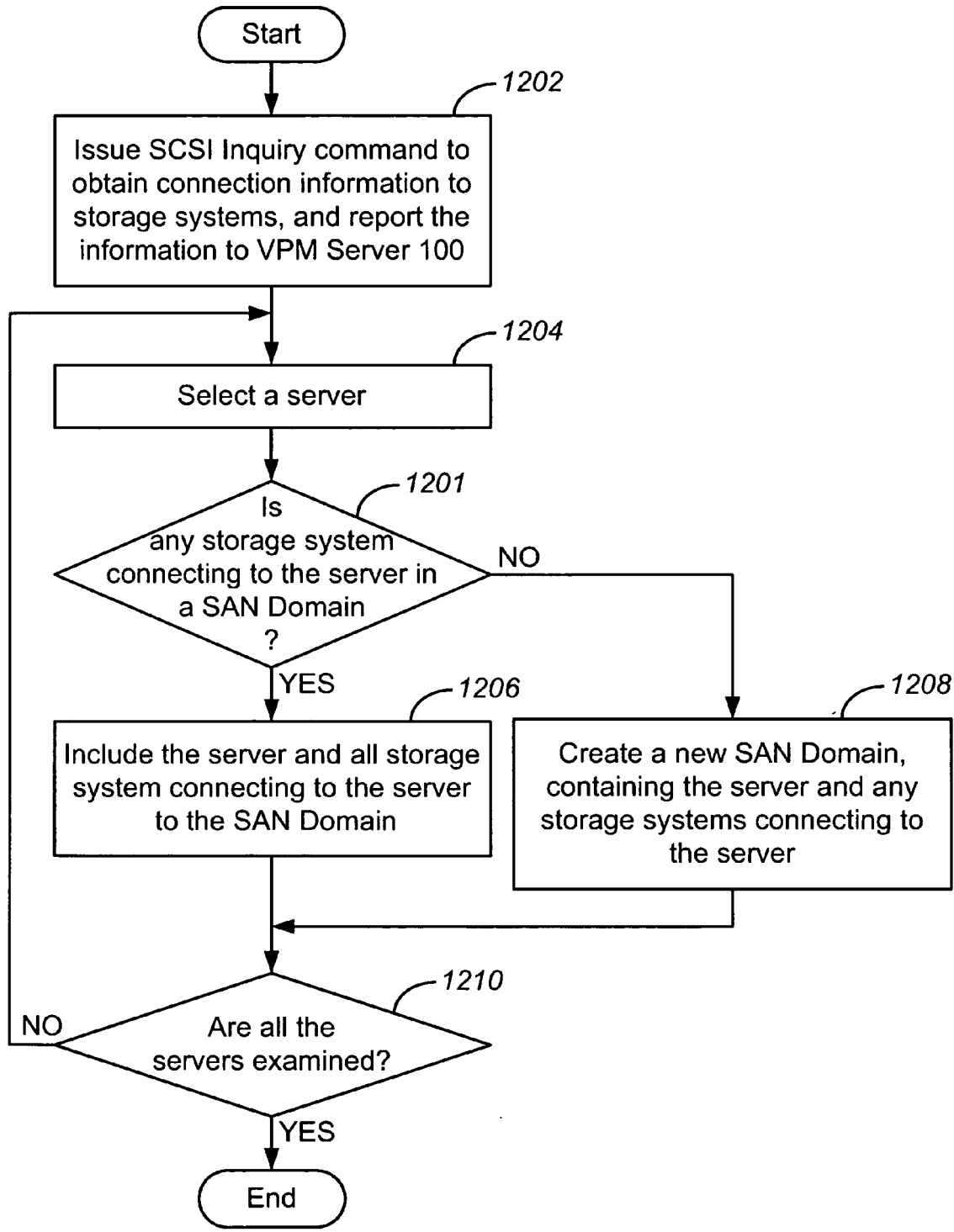
FIG. 12 is a generalized flow chart highlighting the procedure for discovering domains and their connectivity.

FIG. 12 shows a high level flowchart highlighting yet another embodiment of the invention in which groups (loci) of volumes can be automatically identified. In a particular embodiment of this aspect of the invention, the VPM server 1000 defines a locus of volumes as those servers and storage systems which are in data communication with each other via switches. For example, FIG. 10B shows that servers 1010a and 1010b are in communication with each other via switch component 1012a. Server 1010a can communicate via the switch with volume 1050*a*. Likewise, server 1010*b* can communicate via the switch with volumes 1050*a* and 1050*b*. This defines the locus (domain) 1020*a*. In order to limit the scope of the locus of volumes to something less than the entire network, servers and volumes that are accessed over remote links are excluded. Thus, volume 1050*c* is excluded from the locus (domain) 1020*a*.

Thus, in a step 1202, each server 1010*a*–1010*d* determines which storage systems it can access. In a particular implementation, the VPM Agent 111 (FIG. 1) in the server issues a SCSI Inquiry command to obtain connection information about the storage systems to which it is connected. Similarly, connection information to the switches (e.g., 1012*a*) can be obtained by a variety of known ways, e.g., SNMP or some proprietary SCSI or fibre channel command. The VPM Agents from the servers report this connection information to the VPM Server 1000.

Next in a step 1204, for each server (e.g., 1010*b*) that reported connection information, the VPM server 1000 inspects that information to identify each storage system (i.e., 1050*a*, 1050*b*) connected to that server. In a step 1201, it is determined whether that storage system is associated with a SAN domain. If that storage system is associated with a SAN domain, then in a step 1206 the server (e.g., 1010*b*) is associated with the SAN domain, along with all the other storage systems (i.e., 1050*a*, 1050*b*) and switch(es) (i.e., 1022*a*) connected to that server. If that storage system is not associated with a SAN domain, then in a step 1208 a new SAN domain is created. That storage system is then associated with the newly created SAN domain, along with all the other storage systems and switches connected to that server.

This process is then repeated in a step 1210 for each server that reported connection information. The result is the identification of a plurality of domains which have not given any meaningful identifiers. For example, depending on the implementation, the arbitrary identifiers such as "domain-1", "domain-2", and so on can be assigned. A user can enter meaningful domain names and other information manually. This may include location information such as:

- a unique name of the location; e.g., city name, department name, etc.
- an address of the location where the storage system is located
- a name of the sysadmin responsible for managing the locus of volumes
- an e-mail address and phone number of the sysadmin etc.

Referring to FIG. 3G, an entry 340' of the physical volume table is a modified version of the table entry 340 shown in FIG. 3F, enhanced to include a LINK field for each volume. Specifically, a LINK field 342*a* is provided. If the volume is linked to a remote volume(s), its corresponding LINK field will contain information representative of the remote volume(s). Thus with reference to FIG. 10A, the table entry 340' of the physical volume table (shown in FIG. 3G) corresponding to the storage system 1050*a* would have a LINK field entry 342*a* that represents the storage system 1050*c*, since they are linked via the remote link 1022*a*.

The entry 340' also includes a LOCUS (DOMAIN NAME) field 342*b*. This is filled in when groups of volumes are identified as explained in FIG. 12. Thus, again with reference to FIG. 10A, he table entries 340' of the physical volume table (shown in FIG. 3G) corresponding to the storage systems 1050*a* and 1050*b* each would have a LOCUS field entry 342*b* that represents "Santa Clara," since they were identified as belonging to the same group of volumes (locus, domain).

In addition, storage systems belonging to the same locus (or group) can be grouped into the same volume pool. If the storage systems in a locus belong to the same volume pool, then their corresponding entries 403 (FIG. 4) in the volume table information pool 400 will have the same SITENAME field. Thus suppose, in FIG. 10A, the storage systems 1050*a* and 1050*b* which belong to the same locus, also belong to the same volume pool. Their respective SITENAME fields, each would contain "Santa Clara."

The createmirror command can be enhanced to utilize this additional information about remote copy sites. Thus, the createmirror command includes the following additional argument:

| createmirror | mirror_name |
|---|---|
| | [-vol pvol1 [pvol2 ... pvoln]] |
| | [-app appname instname] |
| | [-host hostname] |
| | [-pool pool_name] |
| | [-plevel performance_level] |
| | [-rlevel reliability_level] |
| | [-site sitename] |
| | [-remote remote_sitename] |

-remote: This argument specifies a remote site from which mirror volumes will be selected. A default volume pool is selected from the volume pool at the remote site.

This additional argument can be combined with other arguments to achieve a degree of control in choosing mirror volumes. For example:

createmirror -vol vol1 vol2. . . -remote sitename -pool pool1 allows the user to create mirrors for volumes vol1 vol2, . . . at the remote site (i.e., locus of volumes, SAN domain, etc.) named sitename and specifies that the mirror volumes are to be selected from the volume pool named pool1.

Thus with respect to FIG. 10A, the command createmirror -vol storage_system_$_{1050}$*a* -remote new_york -pool pool1 attempts to initiate a mirror operation for storage system 1050*a* using a remote volume that was located in New York. An entry 340' (FIG. 3G) corresponding to storage system 1050*a* in the physical volume table would have its LINK field 342*a* indicative of the storage system 1050*c*, since volume 1050*a* is connected to volume 1050*c*. The VPM server 1000 would access the table entry 340' (FIG. 3G) for storage system 1050*c* and compare the domain name specified by the -remote flag (i.e., new_york) against the DOMAIN NAME field 342*b*. If there is a match, then the VPM server would access the table entry 400 (FIG. 4) of the Volume Pool Information table corresponding to the volume pool specified by the -pool flag (i.e., pool1). If the storage system 1050*c* is in the specified mirror volume pool, then a mirroring operation between the storage system 1050*a* and 1050*c* can commence.

Now consider the following command (again with respect to FIG. 10A):

createmirror -vol storage_system_1050*b* -remote new_york -pool pool1

The VPM server 1000 would attempt to initiate a mirror operation for storage system 1050*b* using a remote volume that was located in New York. However, the entry 340' (FIG.

3G) corresponding to storage system 1050a in the physical volume table would have its LINK field 342a indicating no remote links, since volume 1050b is not connected to any remote volumes. The VPM server 1000 would look no further and simply return a negative response because the user had specified via the -remote flag that the mirror volume be selected from the remote site.

The following allows the user to specify mirror volumes at the remote sitename have to have performance level 1 and a reliability level 1:

createmirror vol1 vol2. . . -remote sitename -plevel 1 -rlevel 1

This command line creates mirrors for all volumes that contain the Oracle database named PROD1 where the mirror volumes are selected from the remote site named sitename.

createmirror -app Oracle -inst PROD1 -remote sitename

The following creates mirrors for all volumes that form the disk group named VG01 where the mirror volumes are at the remote site named sitename.

createmirror -app VxVM -g VG01-remote sitename

It can be appreciated that this aspect of the invention allows the user to select mirror volumes which are grouped (e.g., SAN domains) without requiring a priori knowledge about the internal connectivity of volumes contained in the group.

system 1050a and 1050c, indicating that there is connectivity to them from storage system 1050d.

When a user wants to create a mirror at the remote site, the following factors can be considered:

PERFORMANCE: The user can provide performance information. Alternatively, the VPM server or the storage system can also collect performance information. Typical performance information may include:

connection between storages or sites : Bandwidth, distance, usage workload pattern: Sequential/Random, IO size, IO/s, etc.

Tables 1 and 2 below show typical values:

TABLE 2

| | | Site information | | | |
|---|---|---|---|---|---|
| | | | Network | | Capacity |
| | Type | Total | Usage | Total | Usage |
| Santa Clara | Local | 2 Gbps | 50% | 1 TB | 70% |
| New York | Main | 48 Gbps | 10% | 100 TB | 85% |
| Dallas | Main-2 | 12 Gbps | 8% | 50 TB | 30% |

TABLE 2

| | | | Site information for Santa Clara | | | |
|---|---|---|---|---|---|---|
| | | Tested | | Network | | Capacity |
| | Type | Throughput | Distance | Total | Usage | Total | Usage |
| New York | Main | 500 Mbps | 3000 mile | 48 Gbps | 10% | 100 TB | 85% |
| Dallas | Main-2 | 200 Mbps | 2000 mile | 12 Gbps | 8% | 50 TB | 30% |

Figure 13:
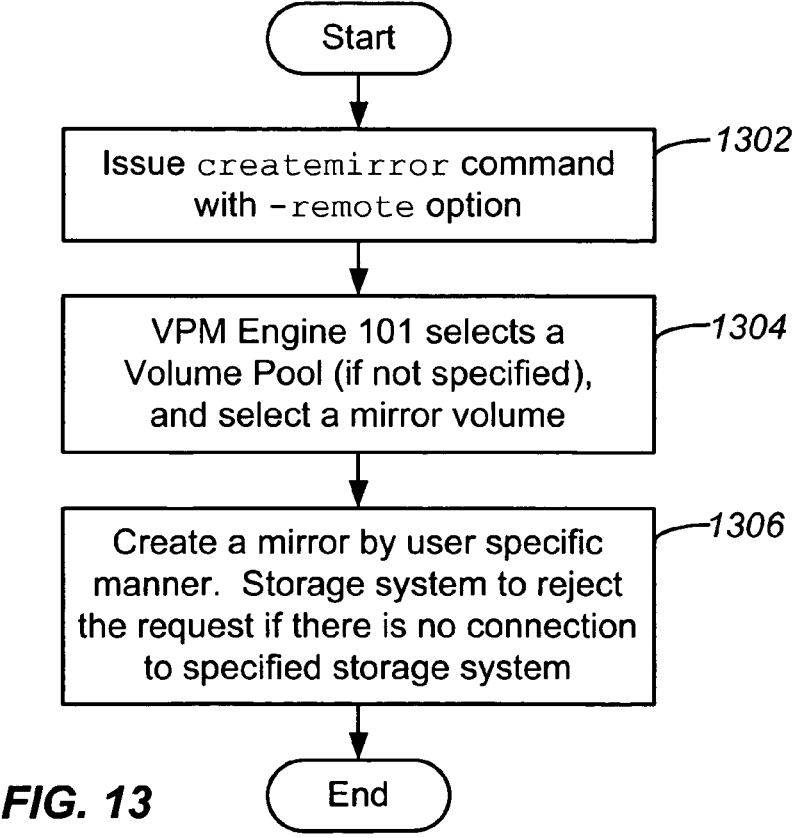
FIG. 13 illustrates the general processing for creating mirror volumes according to another aspect of the invention.

FIG. 13 illustrates the additional processing steps for creating a mirror when the remote flag is used. Thus in a step 1302, a createmirror command is issued with the remote flag. In a step 1304, the VPM engine 101 (FIG. 1) selects a Volume Pool if a pool was not specified with the -pool option. A mirror volume is then selected from the volume pool as outlined in FIG. 7. In a step 1306, the VPM Engine 101 sends a createmirror request to the VPM Agent 111. The VPM Agent then attempts to create a mirror in a manner appropriate for the storage device 151 in the storage system 150. If there is no connection to the requested remote storage system (e.g., 1050a, FIG. 10A), a rejection response is issued.

The user can also set a parameter "-remote BackupDomain". Here "BackupDomain" means SAN Domain which across sites (e.g., Dallas and New York). BackupDomain includes two or more SAN Domains.

In a configuration where a storage system may have two or more remote link connections, such as shown in FIG. 10C, the VPM server can select the best volume to be used with the primary volume. Thus, for example, in FIG. 10C, the storage system 1050d in the SAN domain Dallas is connected to storage system 1050a in the SAN domain Santa Clara via link 1022b and also to storage system 1050c in SAN domain named New York via link 1022c. It can be appreciated that the LINK field in the VPM table of FIG. 4A can be a list, representing a plurality of storage volumes. Thus, the VPM table entry for the storage system 1050d would have LINK field information representative of storage VOLUME ATTRIBUTES: The user can set volume attribute manually. Alternatively, the VPM server or the storage system can collect the attributes automatically. Table 3 shows typical attributes which may include:

usertype importance (NO loss, a little loss, once a day), performance application type.

TABLE 3

| Volume attribute | |
|---|---|
| Type | FC-SCSI |
| Capacity | 50 GB |
| | RAID1 |
| OS | Windows 2000 |
| Application | Exchange Server ™ |
| Workload | Maximum 2 MB/s |
| | Average 11.57 kB/s |
| | Update 1 GB/day |
| Policy | Once a day |
| Owner | IT group |

What is claimed is:

1. A method for storage management comprising:

receiving a command of a first kind, the command comprising first information;

identifying at least one production volume based on the first information;

selecting a candidate storage volume from among a plurality of storage volumes; and initiating mirroring of the production volume with the candidate storage volume, wherein the candidate storage volume is a mirror volume, the step of selecting being based on connection information indicative of any connectivity between the at least one production volume and one or more of the candidate storage volumes, wherein the first information is representative of an application program, the application program having associated therewith a plurality of data objects, wherein the step of identifying includes identifying production volumes which collectively provide storage for all data files comprising one or more of the data objects.

2. The method of claim 1 further including a step of obtaining the connection information comprising:

in a first storage system, attempting a communication with a second storage system; and if a communication with the second storage system is possible, then storing in a data store information indicating that there is communication between the first storage system and the second storage system, wherein the information can be used as connection information.

3. The method of claim 1 wherein the step of identifying further includes interacting with the application to obtain identification information representative of the production volumes.

4. The method of claim 1 wherein the command further comprises second information representative of a first data object, wherein the step of identifying includes identifying production volumes which collectively provide storage for all data files comprising the first data object.

5. The method of claim 1 further including obtaining approval to use the candidate storage volume as a mirror volume.

6. The method of claim 1 wherein the first information is representative of a plurality of production volumes, the step of selecting includes determining a corresponding candidate storage volume for each of the production volumes, and the step of initiating includes initiating mirroring of each of the production volumes with its corresponding candidate mirror volume.

7. The method of claim 1 wherein the command further includes second information representative of one or more of a performance level and a reliability level, wherein the step of selecting is based on the second information.

8. The method of claim 1 further including receiving a command of a second kind, the command of second kind including second information indicative of one or more storage volumes being used to perform mirroring of one or more production volumes, and in response to receiving the command of a second kind, ceasing mirroring of the one or more production volumes and designating the one or more storage volumes as being no longer in use as mirror volumes so that the one or more storage volumes can be selected as candidate volumes in a subsequent selecting step.

9. A data storage system comprising production volumes, mirror volumes, and a volume manager operable in accordance with the method as recited in claim 1.

10. A network area storage system having a volume manager operable in accordance with the method of claim 1.

11. A method for storage management comprising:

receiving a command of a first kind, the command comprising first information;

identifying at least one production volume from among a first plurality of storage volumes based on the first information;

selecting a candidate storage volume from among a second plurality of storage volumes, the second storage volumes each associated with corresponding connection information indicative of any connectivity with any of the first storage volumes, the step of selecting based on the connection information;

initiating mirroring of the production volume with the candidate storage volume, wherein the candidate storage volume is a mirror volume;

receiving a command of a second kind, the command of second kind including second information indicative of one or more storage volumes being used to perform mirroring of one or more production volumes; and in response to receiving the command of a second kind, ceasing mirroring of the one or more production volumes and designating the one or more storage volumes as being no longer in use as mirror volumes so that the one or more storage volumes can be selected as candidate volumes in a subsequent selecting step, the connection information being obtained in an obtaining step comprising:

in a first storage system, attempting a communication with a second storage system; and if a communication with the second storage system is possible, then associating with a storage volume associated to the first storage system information indicating that there is communication between the first storage system and the second storage system.

12. The method of claim 11 wherein each mirror volume has an associated locus information indicative of a group of volumes, the first information further including information representative of a locus, the step of selected further based on the locus.

13. A data storage system comprising production volumes, mirror volumes, and a volume manager operable in accordance with the method as recited in claim 11.

* * * * *